United States Patent [19]
Parry

[11] 4,414,812
[45] Nov. 15, 1983

[54] HOT AIR SOLAR ENGINE

[75] Inventor: John F. W. Parry, Westlake Village, Calif.

[73] Assignee: R & D Associates, Marina del Rey, Calif.

[21] Appl. No.: 259,049

[22] Filed: Apr. 30, 1981

[51] Int. Cl.³ .............................................. F03G 7/02
[52] U.S. Cl. ............................ 60/641.14; 60/641.15; 60/650; 60/682; 126/427
[58] Field of Search ............... 60/517, 650, 682, 641.8, 60/641.14, 641.15; 126/427

[56] References Cited

U.S. PATENT DOCUMENTS 4,094,146 6/1978 Schweitzer ........................ 60/641.4
4,189,922 2/1980 Bellofatto .............................. 60/682

*Primary Examiner*—Allen M. Ostrager
*Attorney, Agent, or Firm*—Poms, Smith, Lande & Rose

[57] ABSTRACT

A hot air solar engine has two heat engines at opposing ends of a common piston assembly to provide alternate cooperative expansion and compression action. Each of the heat engines has a compressor and an expander wherein a single dual-diameter piston head serves as the piston portion of each. The hot air solar engine further includes a solar collector having positioning means for maintaining alignment with the sun's position. The solar collector has a paraboloid cylinder shaped reflector and a heat exchanger assembly disposed about the focal line of the reflector for receiving concentrated sunlight. The heat exchanger assembly includes first and second heat exchangers cooperating with the first and second heat engines. The heat exchangers are comprised of multiple parallel tubes each having a recuperator portion located within a recuperator chamber which receives heated air exhausted by the heat engines, and a collector portion located within a collector chamber equidistant from the focal line of the reflector which receives heat from the concentrated solar radiation. The recuperator chamber is contiguous to the collector chamber to increase solar efficiency, and the heat engines and heat exchanger assembly use environmental air as the working fluid allowing open system operation on an air-standard thermodynamic cycle. Fuel may be supplied to further heat the exhaust air through combustion as it is supplied to the recuperator chamber, thus permitting operation without sunlight.

22 Claims, 22 Drawing Figures

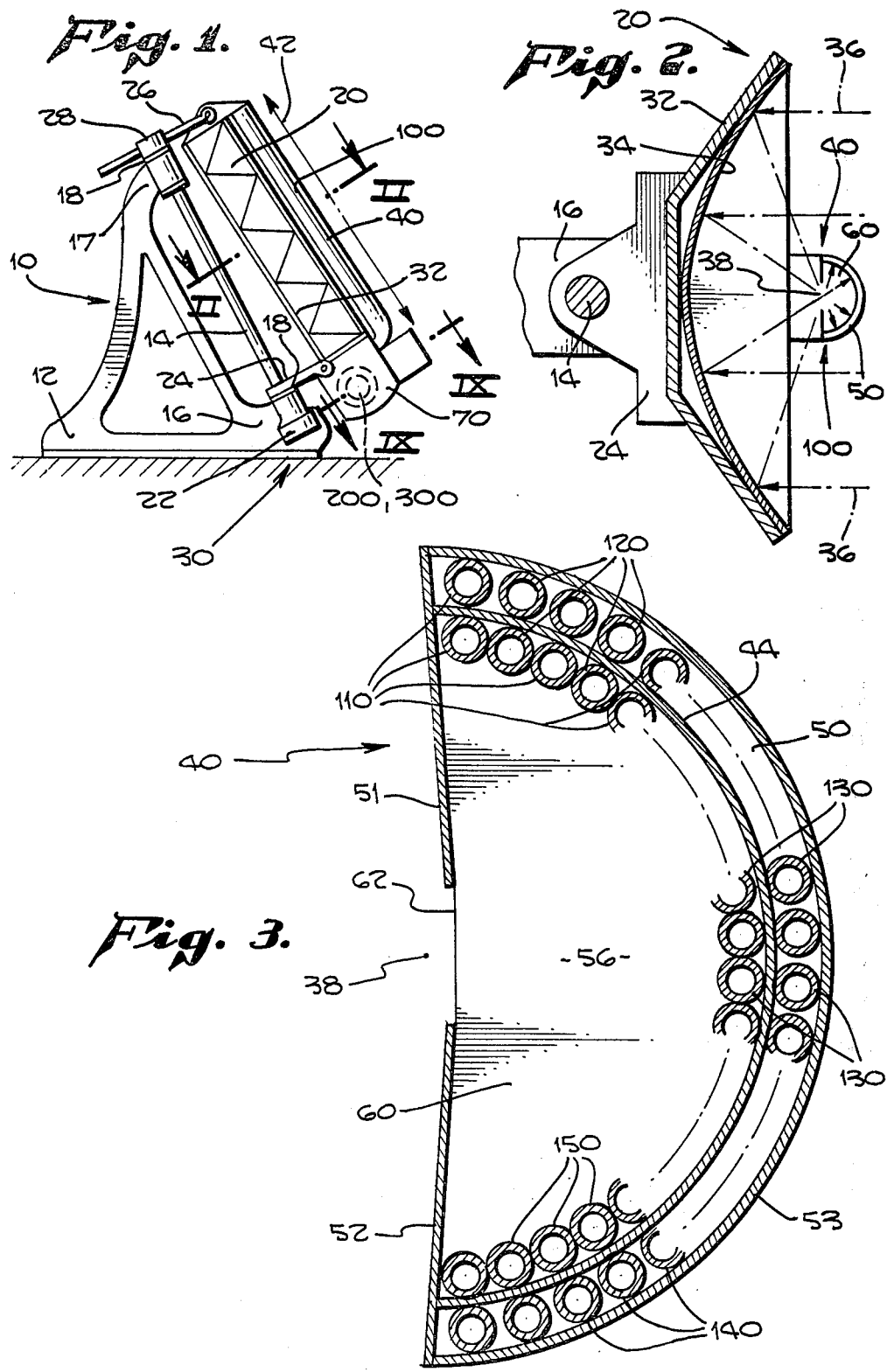

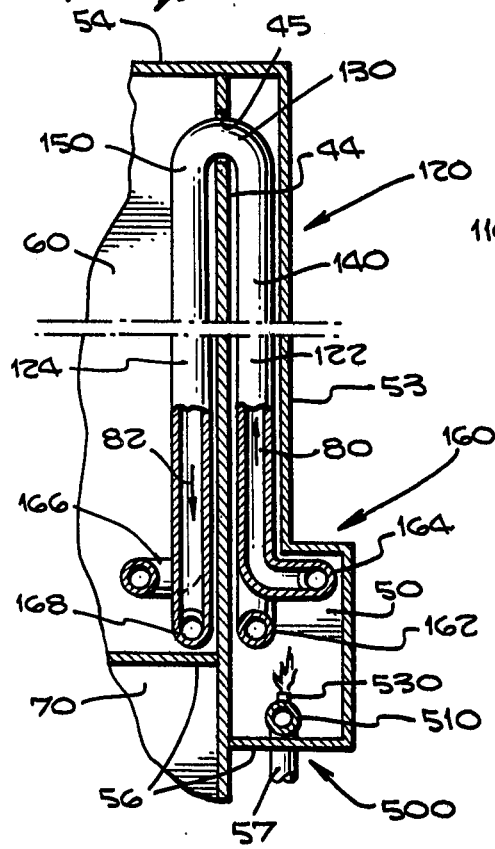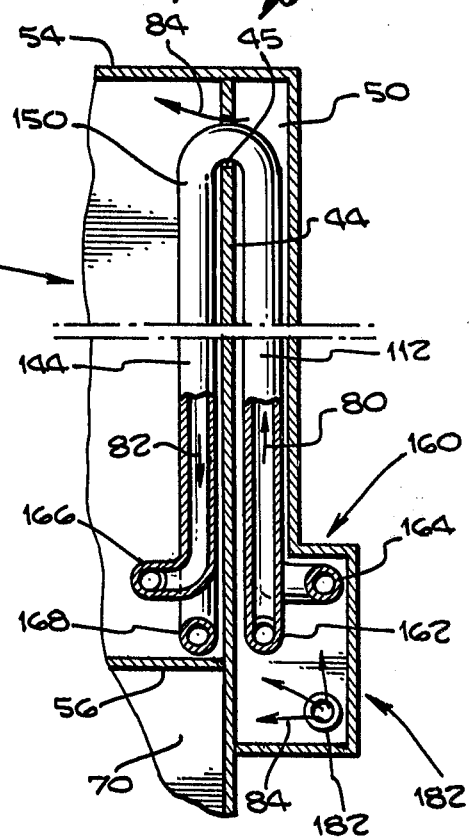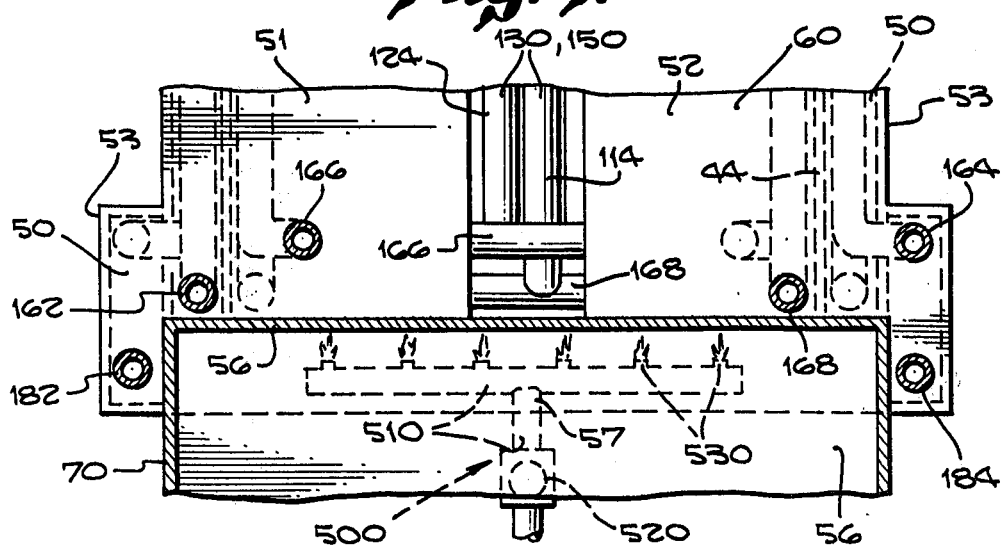

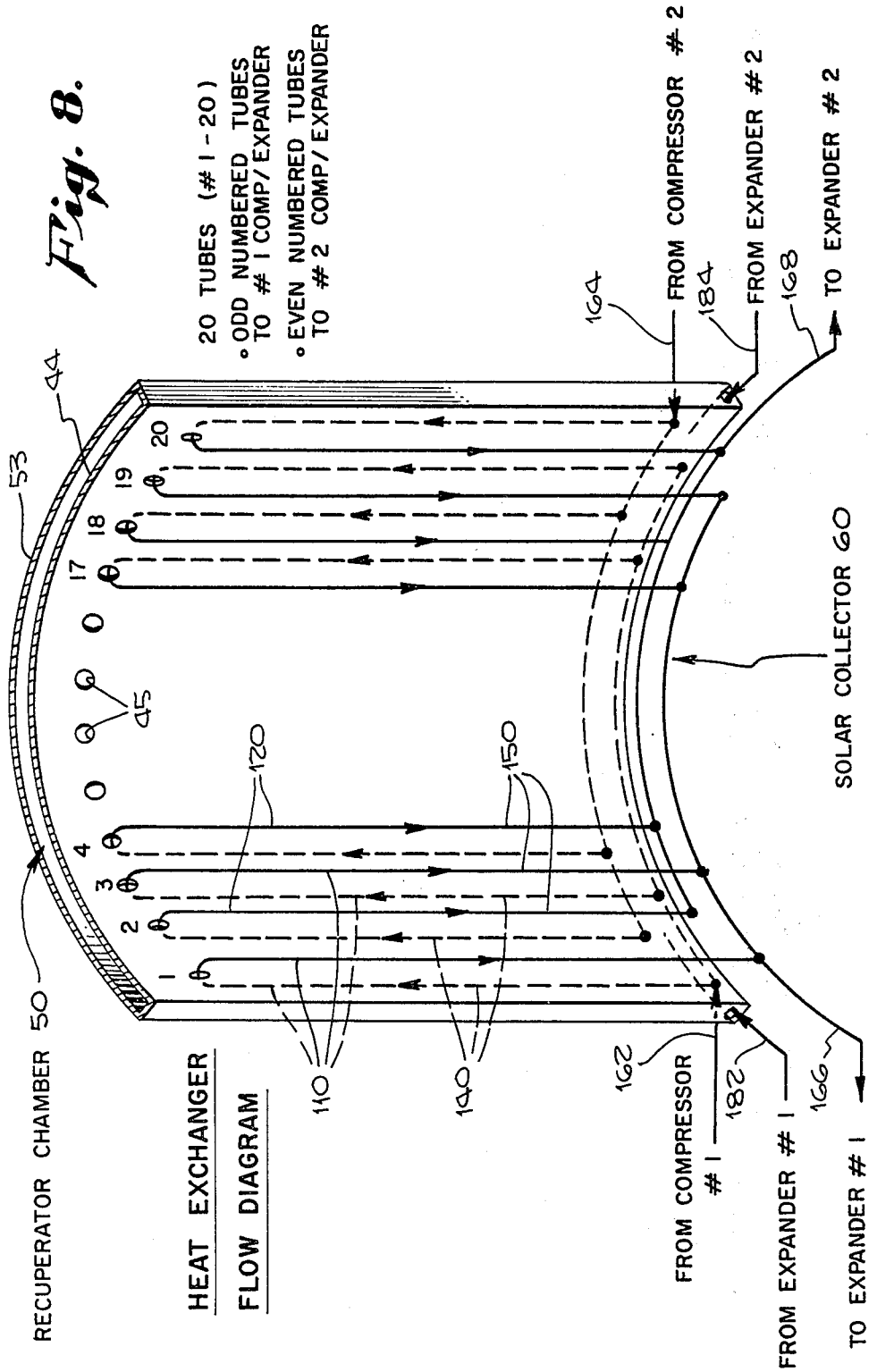

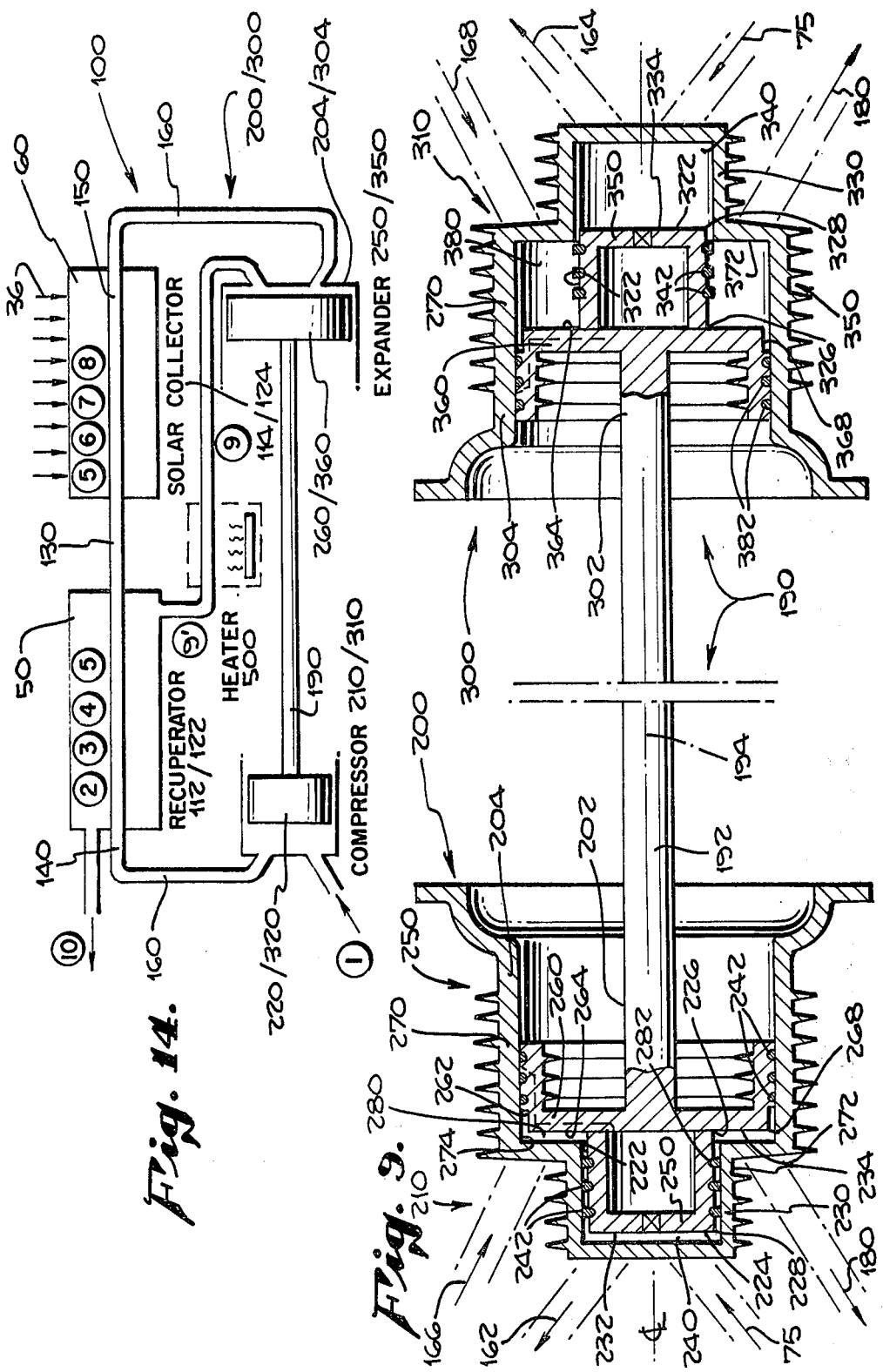

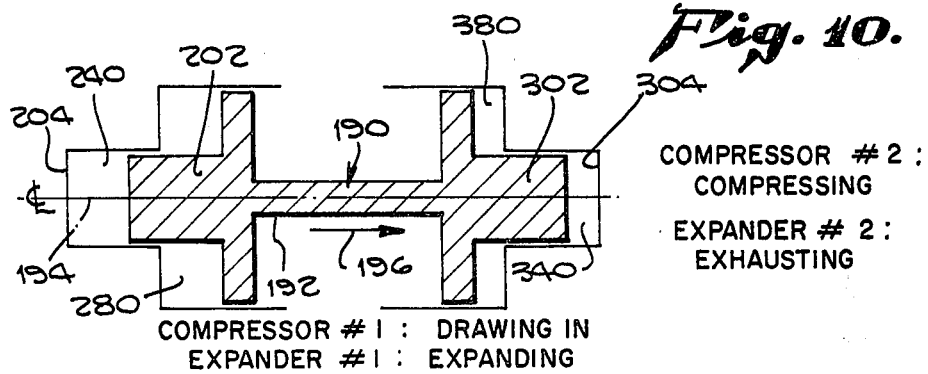

Fig. 10.
COMPRESSOR #2: COMPRESSING
EXPANDER #2: EXHAUSTING
COMPRESSOR #1: DRAWING IN
EXPANDER #1: EXPANDING

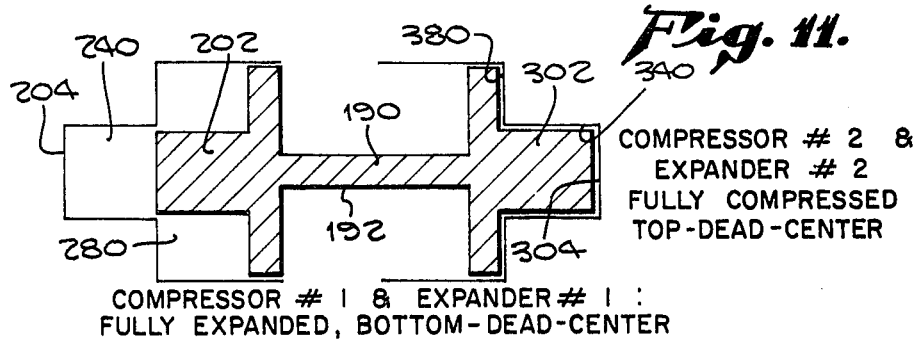

Fig. 11.
COMPRESSOR #2 & EXPANDER #2 FULLY COMPRESSED TOP-DEAD-CENTER
COMPRESSOR #1 & EXPANDER #1: FULLY EXPANDED, BOTTOM-DEAD-CENTER

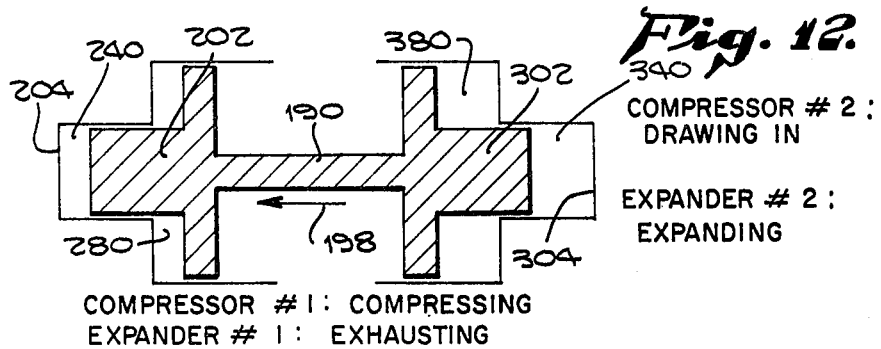

Fig. 12.
COMPRESSOR #2: DRAWING IN
EXPANDER #2: EXPANDING
COMPRESSOR #1: COMPRESSING
EXPANDER #1: EXHAUSTING

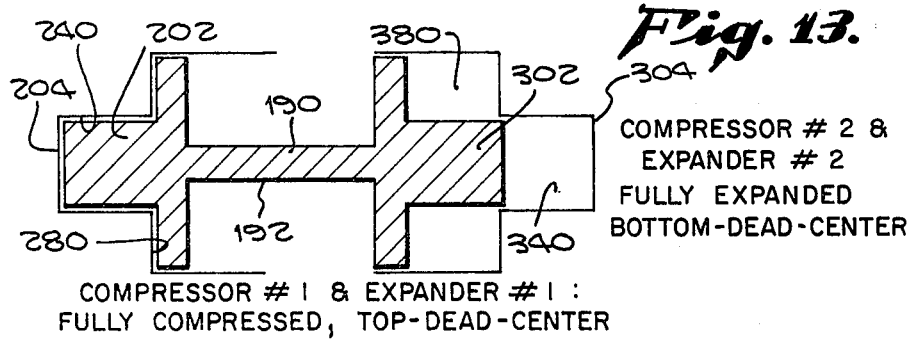

Fig. 13.
COMPRESSOR #2 & EXPANDER #2 FULLY EXPANDED BOTTOM-DEAD-CENTER
COMPRESSOR #1 & EXPANDER #1: FULLY COMPRESSED, TOP-DEAD-CENTER

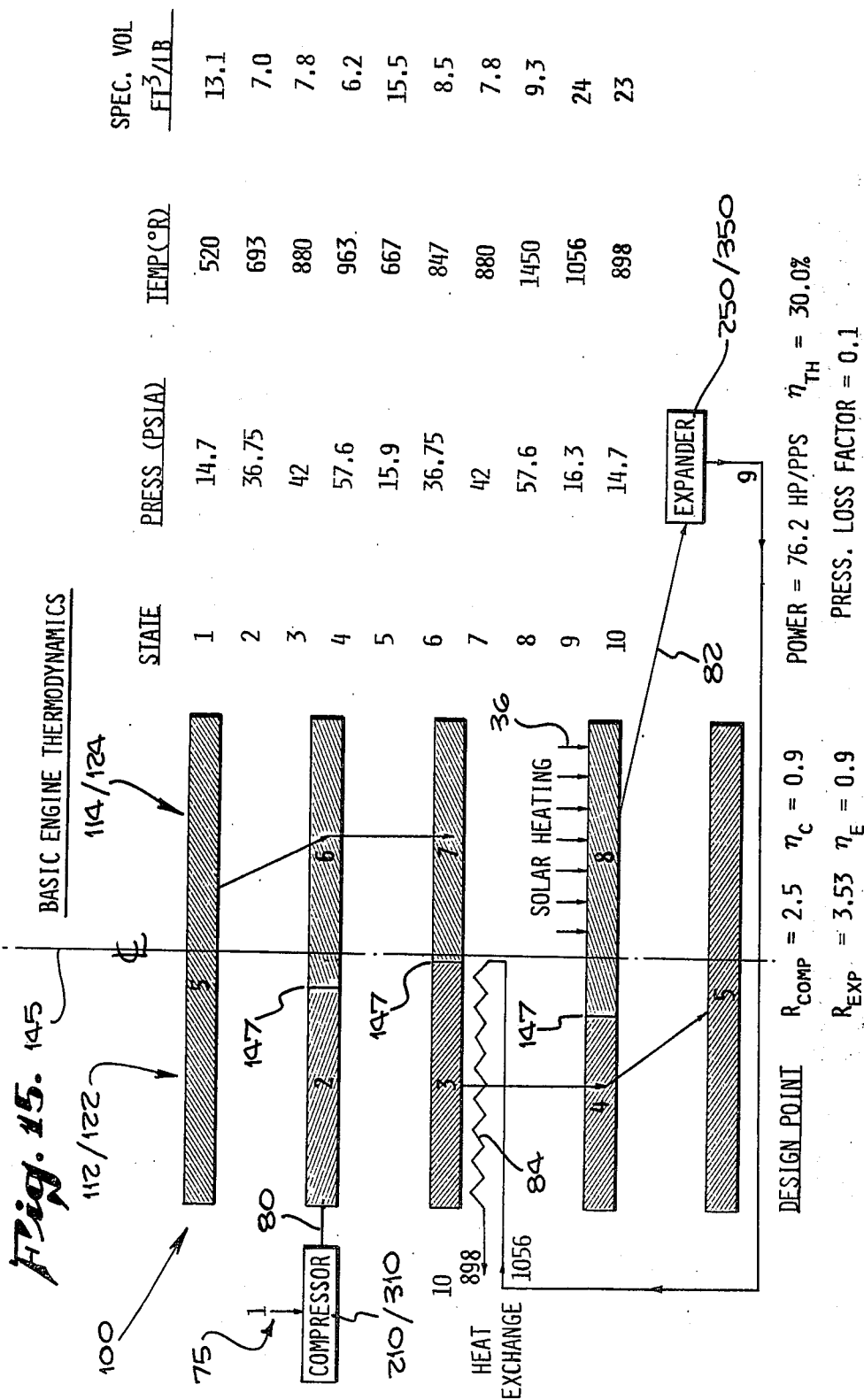

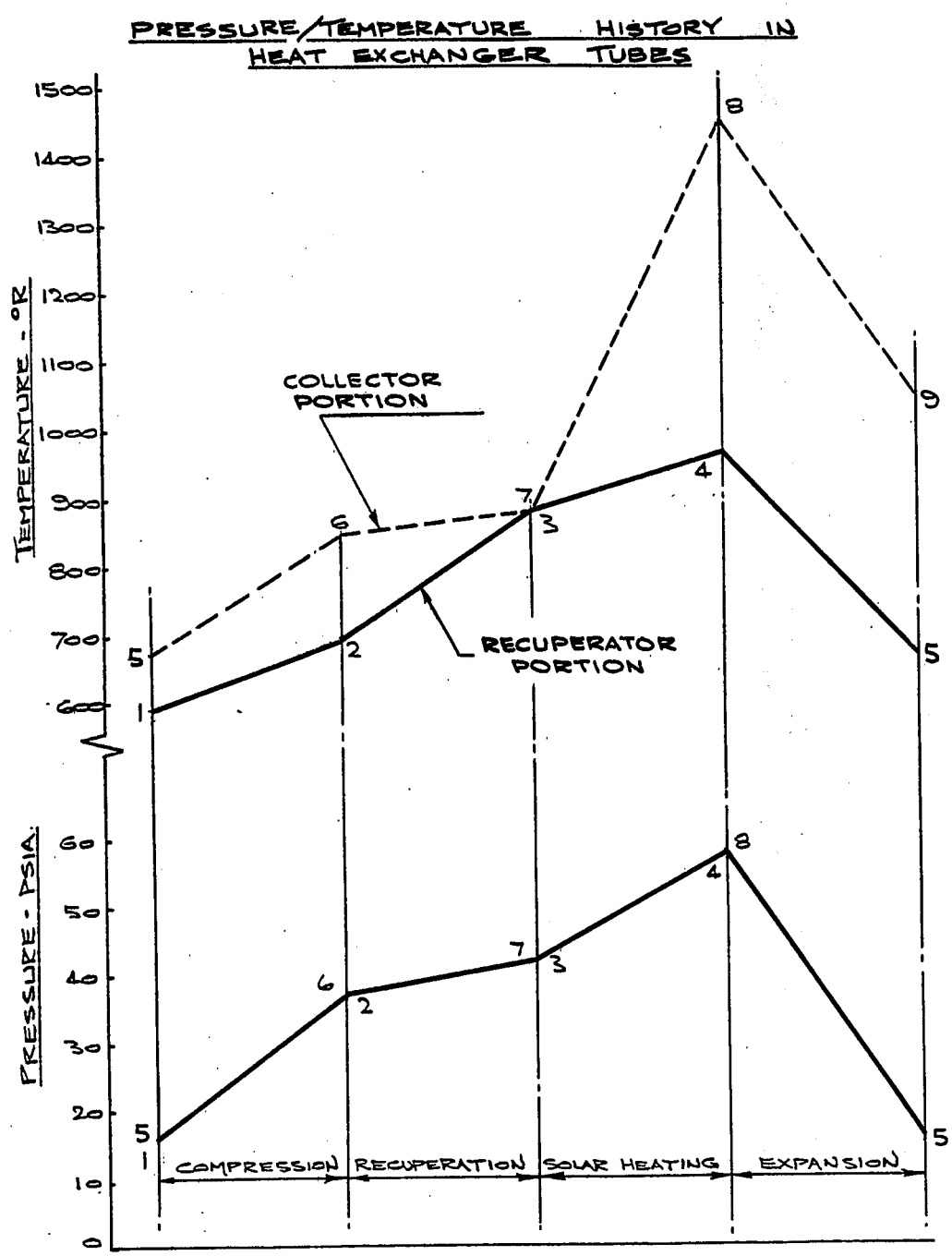

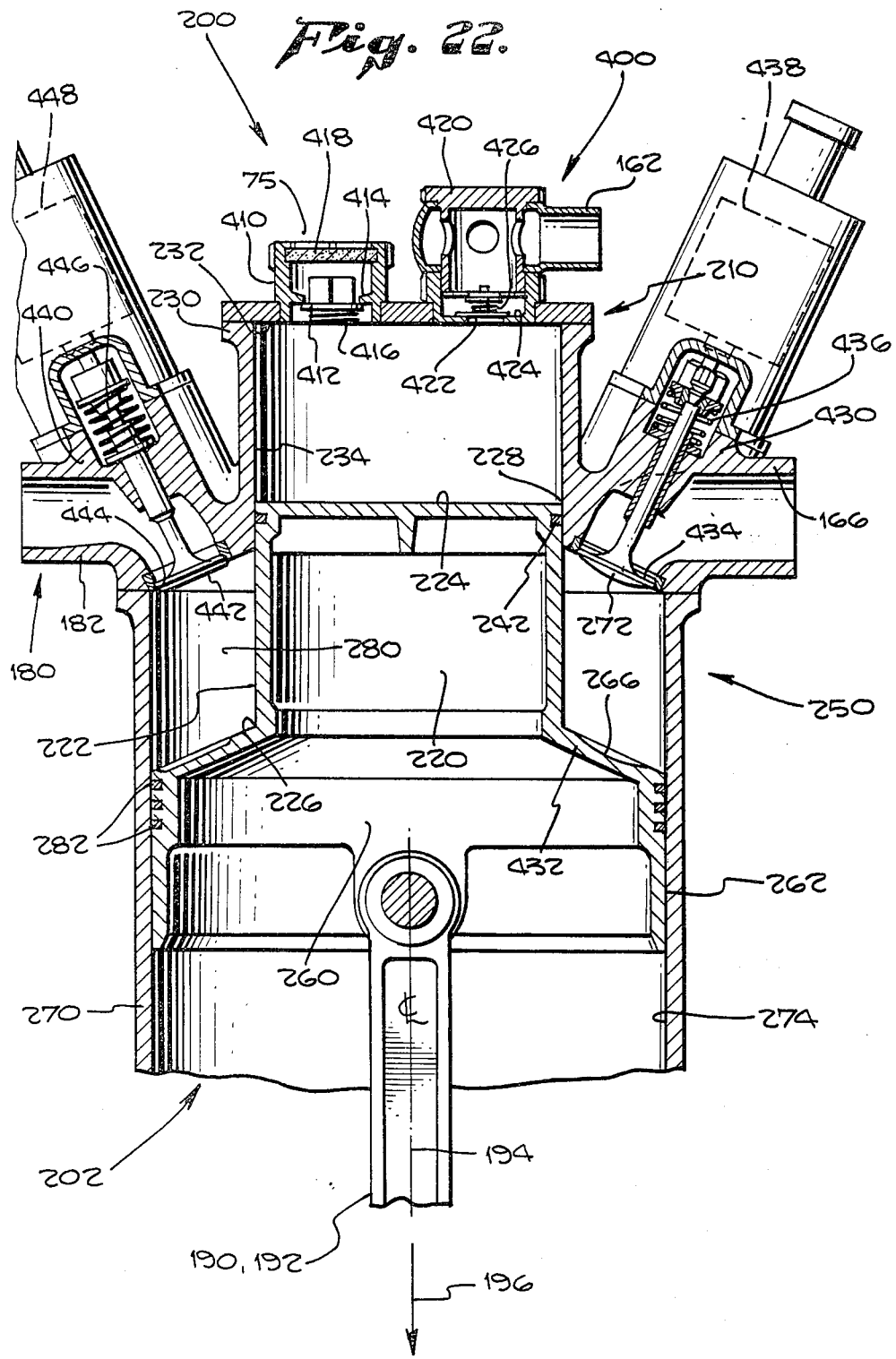

HOT AIR SOLAR ENGINE

This invention refers generally to mechanical expansion type heat engine systems and to heat exchangers for use with solar collectors.

BACKGROUND OF THE INVENTION

Solar collectors are well known in the field of generating and storing energy. Solar collectors typically take a working fluid and channel it through heat exchangers that are exposed to solar radiation and have a high surface area to volume ratio. Such solar collectors may be either flat sheets or include one or more pipes through which a working fluid flows while absorbing heat from solar radiation. Such a solar energy heat exchanger may be used in conjunction with apparatus for the concentration of solar energy such as lenses and curved mirrors. U.S. Pat. No. 4,078,549 issued Mar. 14, 1978, to McKeen, et al., and entitled "Solar Energy Collector", illustrates the use of a parabolic reflector mirror to focus solar radiation through substantially a single linear focal point. The patent discloses a single heat exchanger tube positioned at the focal point for receiving the focused radiant energy. This patent further discloses tracking apparatus for pivotally moving the reflective surface of the collector to maintain it in alignment with the position of the sun during normal daylight hours.

U.S. Pat. No. 3,708,979, issued Jan. 9, 1973, to Bush, et al., and entitled "Circuital Flow Hot Gas Engines", teaches the use of a two-stage heat exchanger in the context of a hot gas engine wherein the working fluid is pre-heated in an interchanger stage by the exhaust of the engine and then is further heated in a second, heater, stage which consists of a fuel-burning furnace, as is known in the art. The patent further teaches the use of a compressor comprised of a first piston and cylinder assembly and an expander comprised of a second piston and cylinder assembly having a larger diameter than the compressor. The pistons of the expander and compressor are interconnected so that they move in unison and the expander has a predetermined cross-sectional area relative to the compressor such that a stroke of the expander piston removes the same mass of heated working fluid from the heat exchanger as was introduced to the heat exchanger by one stroke of the compressor.

U.S. Pat. No. 4,094,146 issued to Schweitzer on June 13, 1978, discloses a single piston combined compressor and expander for use with a solar collector wherein a single diameter piston has two functional faces, one face functionally operating as an expander and the opposite face functionally operating as a concurrent compressor.

It is also generally known in the art to utilize a crank shaft or other mechanical linkage to cause multiple piston assemblies to operate in a coordinated manner such that the compression stroke of one piston may be powered by the expansion stroke of another.

Each of these known prior designs has certain limitations, for example, low efficiency, requirement of a closed system, numerous moving parts, difficult or expensive manufacture of parts, high costs, and low power outputs.

It is accordingly an object of the present invention to disclose and provide a solar engine that operates on an open cycle using air as the working fluid, the air exhibiting the well known thermodynamic properties of an air-standard cycle, where air is withdrawn from and returned to the atmosphere.

It is another object of the present invention to simplify and reduce the number of moving parts and linkages in a hot air solar engine piston assembly.

It is a further object of the present invention to disclose and provide a hot air solar engine having an engine portion which is substantially symmetric and easy to manufacture.

It is yet a further object of the present invention to provide a second, auxilliary heat source for a hot air solar engine thereby allowing 24-hour operation, as well as providing a combined solar and auxilliary heat source operation which produces an increased power level.

It is still a further object of the present invention to increase the energy efficiency of a hot air solar engine by recovering heat from its exhaust.

SUMMARY OF THE INVENTION

The present invention, in accordance with one illustrative embodiment, provides a hot air solar engine incorporating two parallel, interfitted, heat exchangers configured in a longitudinally extending core portion of a parabolic reflector-type solar collector. Coupled to each of the heat exchangers is a mechanical expansion type of heat engine which has a compressor portion for supplying heat absorbing working fluid (air) to the heat exchanger and a mechanical expansion portion for producing useful work by mechanical expansion of heated working fluid provided by the heat exchanger.

In accordance with one feature of the invention, the solar collector core portion of the present invention is configured to receive solar radiation which has been focused to a concentrated focal line by a longitudinally extending parabolic reflector. Heat is absorbed from the solar radiation by multiple heat exchanger tubes connected in parallel, arranged in a semi-circle and positioned substantially equidistant from said focal line and extending the length of the longitudinally elongated solar collector core. This semi-circular arrangement of tubes is contained within a collector chamber having a heat boundary wall extending circumferentially, radially outward of the multiple exchanger tubes relative to the focal line of the solar radiation as one wall of the chamber. Side and end walls are also provided for the collector chamber, leaving only a narrow elongated aperture bisected by the focal line of the parabolic reflector through which solar radiation collected by the solar collector may pass and be received by the multiple heat exchanger tubes which are insulated from the surrounding environment by the chamber walls.

In accordance with another feature of the present invention, a recuperator chamber is provided, positioned contiguous to the collector chamber, and thereby receiving heat from the collector chamber. The heat boundary wall serves as the common wall between the two chambers and is further provided with a row of apertures near one end through which the multiple heat exchanger tubes may pass. The multiple heat exchanger tubes may be configured in a generally up-side down "U" shaped passing through the apertures in the heat boundary wall such that the heat boundary wall bisects the tubes causing one leg of each of the tubes to be positioned radially inward of the wall and thus exposed to solar radiation and the other leg to be positioned within the described recuperator chamber. Exhaust from the expansion type heat engines is ducted into the recuperator chamber wherein it circulates around the heat exchanger tubes and heats the working fluid passing through said multiple tubes. In this configuration, working fluid supplied by a compressor passes upward through the parallel heat exchanger tubes positioned within the recuperator chamber absorbing a first increment of heat from heat engine exhaust and then passes through the heat boundary wall into the collector chamber wherein a second increment of heat is absorbed from the solar radiation collected therein.

In accordance with a further feature of the present invention, the recuperator chamber has an extended length at its lower end and comprises a plenum which receives hot air exhausted by the hot air solar engines and also contains a furnace of multiple fuel burning jets which provide additional heat to the recuperator chamber. This heater serves as an auxilliary heat source which may be used in conjunction with or instead of the solar radiation heat source.

In accordance with still another feature of the present invention, the heat engine is particularly designed to utilize air taken from the environment as the working fluid.

In accordance with a still further feature of the present invention, two opposing hot air engines are provided utilizing a single piston assembly thereby minimizing the number of moving parts. The piston assembly comprises two opposing piston heads interconnected by a unitary connecting rod. Each of the piston heads is further configured to have a compressor portion of a first diameter and an expander portion of a second diameter such that the expander portion has a surface area which provides a mechanical advantage over the surface area of the compressor portion. In this manner, expansion of the expander portion of one heat engine by one of the previously described parallel, interfitted heat exchangers causes coordinated movement of the opposing piston head and thereby accomplishes compression of the compressor portion of the second hot air engine.

More specifically, the preferred embodiment of the present invention includes first and second two-state heat exchangers positioned within a longitudihally elongated collector core of a parabolic reflector-type solar collector. The solar collector itself is rotatably mounted on a base using mounting means that allows the solar collector to pivot about an axis having a predetermined alignment relative to the earth's axis of rotation. Diurnal tracking means are provided for causing rotation of the solar collector about said axis in a manner which maintains the solar collector in alignment with the diurnal position of the sun. Seasonal adjustment means are also provided for adjusting said axis of rotation for seasonal variations in the relative path of the sun in accordance with the annual precession of the earth's axis of rotation relative to the sun. Together, the seasonal adjustment and the diurnal tracking arrangements maintain the reflector portion of the solar collector assembly in an optimum position for receiving solar radiation at all times of daylight.

The previously described multiple parallel heat exchanger tubes are positioned within said collector core such that one portion of each of said tubes extends radially inward of the heat boundary wall receiving radiation reflected by the solar reflector. The other portion of each of the multiple tubes extends through appertures in the heat boundary wall and are encased by a recuperator chamber having the heat boundary wall as a common wall between the solar collector and the recuperator chamber. The portion of the multiple tubes contained within the recuperator chamber are exposed to heated air exhausted from the hot air engines as will be further described. Each of the multiple heat exchanger tubes extending through apertures in the heat boundary wall are alternatively associated with either the first or second heat exchanger and are interconnected at one end of the collector core accordingly. In this manner, a heat exchanger tube of one heat exchanger is interspaced between tubes of the other heat exchanger.

The portion of each of said multiple parallel heat exchanger tubes extending radially inward of said heat boundary wall and exposed to solar radiation comprise the collector stage of each of the parallel heat exchangers and the portions of the tubes extending radially outward of the heat boundary wall, encased within the recuperator chamber, comprise the recuperator stage of each of the heat exchangers.

Dual opposing hot air engines are provided and carried by the solar collector assembly within an engine housing. Each of the hot air engines has a compressor portion for drawing in air from the environment at ambient temperature and pressure and compressing it to a first elevated pressure for supply to the respective two-stage heat exchanger. Each hot air engine also includes a mechanical expander portion interconnected with the compressor portion and having a piston and cylinder configuration for receiving heated air from the respective two-stage heat exchanger and causing that air to expand within the expander chamber, moving the expander piston, and thereby producing useful work. After having produced useful work, the hot air contained within the expander chamber is exhausted and carried back to the recuperator chamber by exhaust heat ducting means wherein the heated air flows around the recuperator portion of each of the multiple heat exchanger tubes providing a first increment of heat to the air contained within those tubes.

The first and second hot air engines together comprise a dual hot air engine which utilizes a unitary piston assembly. This piston assembly comprises the piston portion for each of the respective first and second compressors and first and second mechanical expanders. The piston assembly may be manufactured out of a single piece of metal or may be several pieces rigidly attached together to form a single unitary structure. The piston assembly is shaped to have piston heads of a first diameter at the extreme ends of the piston assembly and a ring-shaped second piston head of a second larger diameter positioned inward with respect to the two piston heads at the extreme ends. In between the two larger piston heads is a connecting rod portion.

Cylinder assemblies are provided to mate with the particular configuration of the piston heads such that each piston head portion together with its mating cylinder portion comprises a variable volume chamber which functions as a mechanical compressor or expander, respectively. The piston portions of each of the engines have a coordinated movement whereby expansion of the chambers at one end of the piston assembly generates a corresponding compression of the chambers at the other end of the piston assembly. In this manner, mechanical expansion caused by heated air at an elevated pressure within the mechanical expander of one of the hot air engines produces compression of new air contained within the compressor portion of the opposing hot air engine, and then expansion at the other end causes compression at the first end. Concurrently, the expansion in one of the hot air engines draws in fresh environmental air into the associated compressor and also removes heated air contained in the opposing expander after having already performed mechanical expansion, delivering it to the exhaust ducting connecting it to the recuperator chamber.

In accordance with an additional aspect of the present invention, a solar engine is further provided with an extended length plenum-type recuperator chamber wherein hydrocarbon fuels may be burned utilizing the oxygen contained in the heated air exhausted from the hot air engines, thereby further heating that air and providing additional heat to the multiple heat exchanger tubes contained within the recuperator chamber. One particular feature of this design is that by-products, or wastes, of combustion are contained in the recuperator chamber and then exhausted into the environment instead of being burned within the heat exchanger tubes and contaminating the hot air engine connected therewith.

Other objects, features, and advantages of the present invention will become apparent from a consideration of the following detailed description of the preferred embodiment and the accompanying drawings.

BRIEF DESCRIPTION OF THE DRAWINGS

FIG. 1 is a side view of a hot air solar engine illustrative of the present invention;

FIG. 2 is an enlarged top section of the collector and core portions of the apparatus of FIG. 1 taken in section along line II—II of FIG. 1;

FIG. 3 is a further enlarged top section of the core portion of the apparatus of FIG. 1 taken in section along line II—II of FIG. 1;

FIG. 5 is a partially cut-away side elevation of the core apparatus of FIGS. 3 and 4 taken in section along line V—V of FIG. 4;

FIG. 6 is a second partially cut-away side elevation of the core apparatus of FIGS. 3 and 4 taken in section along line VI—VI of FIG. 4;

FIG. 7 is a front elevation of the core apparatus of FIGS. 3 and 4 taken in section along line VII—VII of FIG. 4;

FIG. 8 is a schematic isometric representation of the core apparatus of FIGS. 3 and 4;

FIG. 9 is a section view of the heat engine portion of the present invention taken in section along a plane shown by line IX—IX of FIG. 1 and bisecting the longitudinal axis of said heat engine;

FIG. 10 is a schematic representation of the apparatus of FIG. 9 shown in a first condition of operation;

FIG. 11 is a schematic representation of the apparatus of FIG. 9 shown in a second condition of operation;

FIG. 12 is a schematic representation of the apparatus of FIG. 9 shown in a third condition of operation;

FIG. 13 is a schematic representation of the apparatus of FIG. 9 shown in a fourth condition of operation;

FIG. 14 is a schematic representation of the hot air solar engine system of the present invention;

FIG. 15 is a diagram and chart of the thermodynamic properties of the hot air solar engine system of FIG. 14 for different states of operation;

FIG. 16 is a diagram of the pressure cycle and the temperature cycle occurring in the hot air solar engine system of FIG. 14;

FIG. 21 is a more complete showing of the heat engine portion of the present invention taken in section along a plane defined by the line IX—IX of FIG. 1 and bisecting the longitudinal axis of said heat engine portion; and FIG. 22 is another elevation of the heat engine apparatus of FIG. 21 shown in a second condition of operation.

DETAILED DESCRIPTION OF A PREFERRED EMBODIMENT

Figure 4:
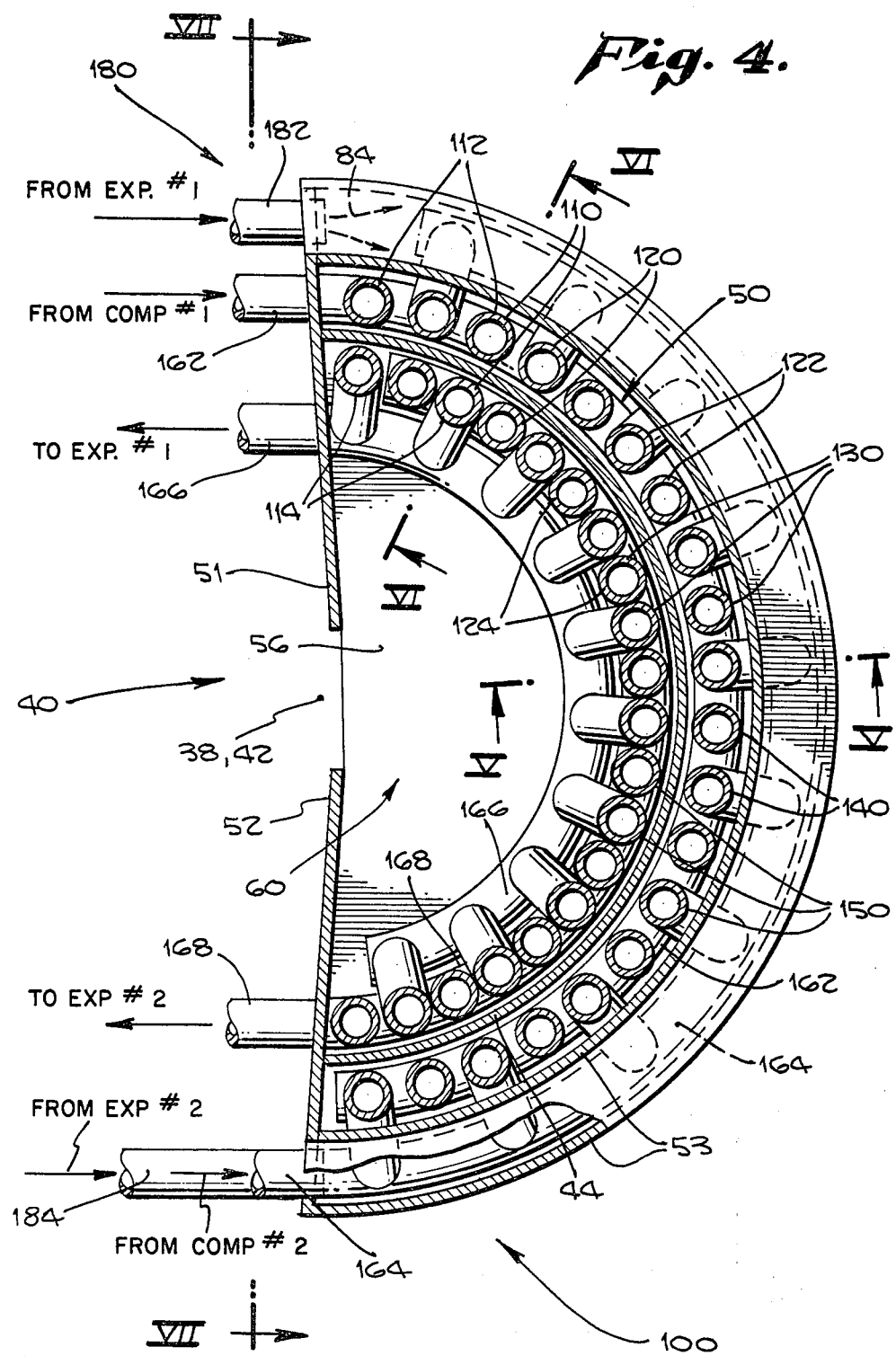
FIG. 4 is an enlarged top elevation of the core portion of the apparatus of FIG. 1 taken in section along line II—II of FIG. 1.

Referring more particularly to the drawings, in FIGS. 1-9, a preferred embodiment of a hot air solar engine illustrative of the present invention is shown. Referring initially to FIG. 1, a solar collector assembly 10 has a solar collector 20 rotatably carried by a base 12. Base 12 may be rigidly positioned on firm ground, the roof of a structure, or other suitable location. The base 12 may have sufficient mass and contact surface such that it is substantially immovable, or it may be rigidly mounted or anchored to its location.

SOLAR COLLECTOR

Solar collector 20 is rotatably mounted relative to base 12 by mounting structure which includes lower and upper collector mounting structure 24 and 26, rigidly attaching solar collector 20 to rotatable shaft 14. Shaft 14 is rotatably mounted to base 12 by lower and upper mounting 16 and 17 which each have bearing surfaces 18 adapted to receive shaft 14.

Seasonal adjustment means 28 are provided on said upper collector mounting structure 26 for adjusting the angle formed by the axis of rotation of the solar collector assembly 10 defined by shaft 14 relative to the horizontal plane defined by base 12 to account for the annual precession of the axis of rotation of the earth relative to the sun, and for the particular latitude at which the solar collector assembly 10 is installed. When properly adjusted, said seasonal adjustment means 28 maintains the axis of rotation of the solar collector 12, shaft 14, parallel with the axis of the earth's rotation about the sun.

Diurnal tracking means 22 are provided for tracking the diurnal position of the sun and maintaining the solar collector in alignment therewith. Said diurnal tracking means 22 is mounted on the lower mounting arm 16 of base 12 and connected with lower collector mounting structure 24 and shaft 14 for causing said solar collector 12 mounted on shaft 14 to rotate relative to base 12. Said diurnal tracking means 22 includes a drive motor for rotating said solar collector 12 so that it follows the diurnal movement of the sun.

Together, said seasonal adjustment means 28 and diurnal tracking means 22 comprise positioning means 30 for maintaining solar collector 12 in alignment with the sun and thereby providing optimal collection of solar energy by solar collector 12.

Referring to FIG. 2, solar collector 20 more particularly comprises a frame 32 mounted by said upper and lower collector mounting structure 24 and 26 and carrying a reflector 34 having the shape of a paraboloid cylinder portion. More specifically, reflector 34, when viewed perpendicular to its longitudinal axis 42, has a parabolic cross-section, as shown in FIG. 2, such that solar radiation 36 is reflected at all points along the concave surface of reflector 34 to a single focal point 38. Said parabolic cross-section of reflector 34 extends uniformly along the entire longitudinal length of said reflector 34 such that the loci of the focal points for each parabolic cross-section of reflector 34 define a focal line 38 extending parallel to said longitudinal axis 42 of reflector 34.

SOLAR COLLECTOR CORE

Solar collector 20 is further provided with collector core 40 having a generally semi-circular cross-section, as shown in FIG. 2. More particularly, collector core 40 is substantially defined by a half-hollow cylinder having an axis coinciding with linear focal point or focal line 38. Said collector core 40 includes a circumferentially extending heat boundary wall 44 corresponding with the radially inward surface of said half-hollow cylinder and which at all points is radially equidistant from said focal line 38.

A recuperator chamber 50 is provided, as shown in FIG. 3, having a shape and location defined by the interior of said half-hollow cylinder. More specifically, said recuperator chamber 50 is defined by the radially outward surface of said heat boundary wall 44, the radially outward surface of said half-hollow cylinder which defines outward chamber wall 53, first and second chamber end walls 51 and 52, and chamber top and bottom walls 54 and 56, as shown in FIGS. 5 and 6. Together, the interior surfaces of said walls define an enclosed recuperator chamber 50 which is longitudinally elongated and has a C-shaped cross-section.

Collector core 40 is also provided with a partially closed collector chamber 60 which is defined as a longitudinally elongated chamber having a semi-circular cross-section formed by the radially inward surfaces of said heat boundary wall 44, the axially inward portion of chamber top wall 54 and chamber bottom wall 56, and radially inward extensions of said first and second chamber end walls 51 and 52. Said radially inward extensions of said first and second chamber end walls 51 and 52 extend substantially to, but not in occlusion with, focal line 38 such that a longitudinally elongated rectangular aperture 62 remains unoccluded, allowing solar radiation 36 reflected by reflector 34 to pass through focal line 38 and into collector chamber 60. Focal line 38 extends midline of said aperture 62 which is defined by the radially inward ends of first and second chamber end walls 51 and 52, chamber top wall 54 and chamber bottom wall 56.

FIG. 1 also shows heat engine housing 70 displaced below and attached to said solar collector 20. Said heat engine housing 70 contains dual opposing hot air engines 200 and 300 including first and second compressors 210 and 310 and first and second mechanical expanders 250 and 350. Said first and second compressors 210 and 310 draw in air 80 from the environment 75 as working fluid. The air 80 has an initial specific heat corresponding with the ambient temperature and pressure of environment 75. Compressor 210 or 310 then mechanically compresses it to a first pressure. Said first and second expanders 250 and 350 receive heated air 82 at a second, higher pressure and specific heat and allow it to perform useful work by mechanical expansion. Said first and second compressors 210 and 310 and said first and second expanders 250 and 350 are best configured as piston and cylinder assemblies. The specific piston and cylinder assembly contemplated as a feature of the present invention will be described later in more detail.

HEAT EXCHANGERS

Referring to the system schematic, FIG. 14, heat exchanger means 100 are included in said solar collector assembly 10 and are adapted to receive compressed air 80 from one or more mechanical compressors 210 and 310 at said first pressure, impart heat to that air and deliver the heated air 82 to the first and second mechanical expanders 250 and 350 wherein the heated air 82 will perform useful work. In the present invention, said heat exchanger means 100 includes first and second two-stage heat exchangers 110 and 120, each comprised of parallel conduits. In the preferred embodiment, said conduits comprise multiple heat exchanger tubes 130 having recuperator portions 140 and collector portions 150, schematically shown in FIG. 8.

Referring to FIGS. 3-7, each of said multiple heat exchanger tubes 130 comprises a tube for carrying a heat absorbing working fluid such as air 80. Said tube 130 is formed of a thermally conductive material which can structurally contain the operating pressures expected for the system and shown in FIG. 15. Said heat exchanger tubes 130 are typically formed of non-brittle metal and preferrably metals that are only elastically deformable within the expected pressure range. In the preferred embodiment, said heat exchanger tubes 130 have a circular cross-section which is uniform throughout the length of said tubes and each of said tubes has a generally up-side down elongated "U" shape such that air travelling through said heat exchanger tubes 130 would ascend one leg of the "U" shape, referred to as the recuperator portion 140 of each of said heat exchanger tubes 130, and descend the other leg of said "U" shape, referred to as the collector portion 150 of each of said heat exchanger tubes 130.

The previously described heat boundary wall 44 is provided with multiple apertures 45 located at the upper end thereof in a plane substantially perpendicular to longitudinal axis 42 for receiving the horizontal portion connecting the legs or portions 140 and 150 of each of the heat exchanger tubes 130. By this means, multiple heat exchanger tubes 130 may be positioned about said heat boundary wall 44 such that each tube 130 passes through an aperture 45. In this arrangement, heat boundary wall 44 substantailly bisects each "U" shaped tube so that the recuperator portion 140 of each of said tubes 130 is positioned on the radially outward or convex side of said heat boundary wall 44 and said collector portion 150 of each of said heat exchanger tubes 130 is positioned on the radially inward side of said heat boundary wall 44. The recuperator portion 140 of each of said heat exchanger tubes 130 is thereby positioned within the previously described recuperator chamber 50 and the collector portion 150 of each of said heat exchanger tubes 130 is positioned within the previously described collector chamber 60. Each of said collector portions 150 of said heat exchanger tubes 130 is thereby exposed to solar radiation 36 passing through said focal line 38 and into collector chamber 60.

Together, the recuperator portions 140 of the multiple tubes 130 comprise the recuperator stages 112 and 122 of said first and second heat exchangers 110 and 120. Similarly, collector portions 150 of the multiple tubes 130 comprise the collector stages 114 and 124 of said first and second heat exchangers 110 and 120.

Multiple interconnecting tubes 160 are provided for connecting the ends of each of said heat exchanger tubes 130 such that a quantity of said heat exchanger tubes 130 are connected in parallel. In the preferred embodiment, said multiple heat exchanger tubes 130 arranged about said heat boundary wall 44 are alternately associated with either said first 110 or second 120 two-stage heat exchanger and associated first or second heat engine 200 or 300. It is specifically contemplated in the present invention that any pair of heat exchanger tubes 130 are associated with different two-stage heat exchangers 110 or 120. In other words, for any particular heat exchanger tube 130 associated with one two-stage heat exchanger 110 or 120, any heat exchanger tubes 130 adjacent to said tube is associated with the other two-stage heat exchanger 120 or 110. Accordingly, said interconnecting tubes 160 more specifically comprise first and second recuperator portion interconnecting tubes 162 and 164 and first and second collector portion interconnecting tubes 166 and 168. As shown in FIG. 4, interconnecting tubes 160 have a substantially semi-circular shape such that said first and second recuperator portion interconnecting tubes 162 and 164 extend substantially horizontally and circumferentially around the lower end of said recuperator chamber 50 and said first and second collector portion interconnecting tubes 166 and 168 extend substantially horizontally and circumferentially around the radially outward edge of the lower end of collector chamber 60.

For a better understanding of the interconnection of heat exchanger tubes 130 as contemplated by the present invention, reference is made to FIG. 8 and the positioning of 20 heat exchanger tubes 130 with respect to a schematic heat boundary wall 44, radially inward collector chamber 60, and radially outward recuperator chamber 50. In this view, said 20 heat exchanger tubes 130 are shown sequentially numbered according to their order of succession from the schematically shown first chamber end wall 51 to the schematically shown second chamber end wall 52 for ease of reference. Accordingly, all odd numbered heat exchanger tubes 130 are interconnected in parallel by interconnecting tubes 160 to form said first two-stage heat exchanger 110. All even numbered heat exchanger tubes 130 are interconnected in parallel by interconnecting tubes 160 to form said second two-stage heat exchanger 120.

More specifically, said first recuperator portion interconnecting tube 162 is connected with the recuperator portions 140 of the odd numbered heat exchanger tubes 130 and passes through first chamber end wall 51 for connection with first compressor 210 associated with said first two-stage heat exchanger 110. Said first collector portion interconnecting tube 166 similarly interconnects the collector portions 150 of the odd numbered heat exchanger tubes 130 associated with said first two-stage heat exchanger 110 and passes through first chamber end wall 51 for connection with first expander 250. Said second recuperator portion interconnecting tube 164 interconnects the recuperator portions 140 of the even numbered heat exchanger tubes 130 associated with said second two-stage heat exchanger 120 and passes through second chamber end wall 52 for connection with second compressor 310. Said second collector portion interconnecting tube 168 interconnects the collector portions 150 of the even numbered heat exchanger tubes 130 associated with said second two-stage heat exchanger 120 and passes through second chamber end wall 52 for connection with second expander 350.

FIG. 6 specifically shows the recuperator portion 140 of an odd numbered heat exchanger tube 130 connected with said first recuperator portion interconnecting tube 162, and the collector portion 150 of said heat exchanger tube 130 connected with said first collector portion interconnecting tube 166. Similarly, FIG. 5 shows an even numbered heat exchanger tube 130 with its respective recuperator portion 140 connected with said second recuperator portion interconnecting tube 164, and its collector portion 150 connected with second collector portion interconnecting tube 168.

FIGS. 4 and 7 show said first recuperator portion interconnecting tube 162 and said first collector portion interconnecting tube 166 extending through said first chamber end wall 51 for connection with first heat engine 200. These figures also show said second recuperator portion interconnecting tube 164 and said second collector portion interconnecting tube 168 extending through said second chamber end wall 52 for connection with said second heat engine 300.

HOT AIR ENGINE

First and second heat engines 200 and 300 are provided for converting the heat collected by solar collector assembly 10 into useful work. Accordingly, said first heat engine 200 includes a first compressor 210 for providing working fluid 80 to said heat exchanger means 100 at a first pressure. First heat engine 200 also includes first mechanical expander 250 for receiving working fluid 82 heated by said heat exchanger means 100 within a fixed volume to a second, higher pressure and causing mechanical expansion of that heated working fluid 82 to produce useful work. A second heat engine 300 is similarly provided with second compressor 310 and second mechanical expander 350 for operation similar to said first heat engine 200. Each of said first and second compressors 210 and 310 and said first and second mechanical expanders 250 and 350 are particularly contemplated to be configured in a piston and cylinder arrangement such that the compression and expansion functions of each of said heat engines 200 and 300 are accomplished by mechanical changes of volume of compression and expansion chambers 240, 340, 280 and 380.

In the preferred embodiment, a single unitary piston assembly 190 is provided for interconnecting said first and second compressors 210 and 310 and said first and second mechanical expanders 250 and 350. Said piston assembly 190 is provided with first piston head portion 202 and second piston head portion 302 arranged in an opposing relationship and interconnected by a rigid connecting rod 192 such that each of said piston head portions 202 and 302 and said connecting rod 192 are mutually coaxial with a common longitudinal axis 194.

First piston head portion 202 comprises the piston portion of first heat engine 200 and more specifically includes compressor portion 220 which serves as the piston portion of first compressor 210, and expander portion 260 which serves as the piston portion of first mechanical expander 250. Similarly, second piston head portion 302 comprises the piston portion of second heat engine 300 and more specifically includes compressor portion 320 which serves as the piston portion of second compressor 310, and expander portion 360 which serves as the piston portion of second mechanical expander 250. For either said first heat engine 200 or said second heat engine 300, the respective piston head portion 202 or 302 has a compressor portion 220 or 320 having cylindrical surface 222 or 322 defined by the radially outward surface of a cylinder having a first diameter and coaxial with said longitudinal axis 194 and a compressor face 224 or 324 defined by a circular planar surface of said first diameter perpendicular to said longitudinal axis 194. Said compressor face 224 or 324 is located at the distal end 228 or 328 of said cylindrical surface 222 or 322 of compressor portion 220 or 320 with respect to connecting rod 192 of piston assembly 190.

Each of said piston head portions 202 and 302 also includes an expander portion 260 or 360 contiguous to said compressor portion 220 or 320 and defined by the radially outward cylindrical surface 262 or 362 of a cylinder having a second, larger diameter and coaxial with said longitudinal axis 194. Said expander portion 260 or 360 further includes an expander face 264 or 364 defined by a substantially planar ring-shaped surface perpendicular to said longitudinal axis 194 whereby the radially outward edge of said ring-shaped surface is a circle having said second diameter and the radially inward edge of said ring-shaped surface is a circle having said first diameter. In this manner, said expander face 264 or 364 is the face formed by the step-change of diameter from said first diameter cylindrical surface 222 or 322 of compressor portion 220 or 320 to said second diameter cylindrical surface 226 or 362 of said expander portion 260 or 360 as particularly shown in FIG. 9.

Expander face 264 or 364 may alternatively be configured with a bevel surface that is not perpendicular to said longitudinal axis 194 as particularly shown in FIGS. 21 and 22. In this alternative embodiment, said expander portion 260 or 360 has a bevel expander face 266 or 366 defined by the surface of a right hollow frustum cone coaxial with said longitudinal axis 194 and interspaced between the cylindrical surface 222 or 322 of compressor portion 220 or 320 and the cylindrical surface 262 or 362 of expander portion 260 or 360. The base of said right frustum cone coincides with the distal end 268 or 368 of the cylindrical surface 262 or 362 of expander portion 260 or 360 and has said second, larger diameter. The frustum of said right frustum cone coincides with the medial end 226 or 326 of the cylindrical surface 222 or 322 of the compressor portion 220 or 320 and has said first diameter.

Referring again to FIG. 9, said first and second heat engines 200 and 300 are further provided with first and second cylinders 204 and 304, respectively. Each of said cylinders 204 and 304 has a compressor cylinder portion 230 or 330 adapted to receive compressor portion 220 or 320 of piston head portion 202 or 302, and an expander cylinder portion 270 or 370 adapted to receive expander portion 260 or 360 of piston head portion 202 or 302. First and second cylinders 204 and 304 are designed to mate with the respective first or second piston head portion 202 or 302 of piston assembly 190 such that variable volume chambers 240, 340, 280, and 380 are created and the volume of these chambers vary with reciprocating motion of piston assembly 190 along longitudinal axis 194.

The compressor cylinder portions 230 and 330 of said first and second cylinders 204 and 304 are defined by a cylinder face 232 or 332 having said first diameter, disposed perpendicular to longitudinal axis 194, and serving as one end of a cylindrical volume. Said cylindrical volume is further defined by cylindrical surface 234 or 334 of compressor cylinder portion 230 or 330, being the radially inward surface of a hollow cylinder having said first diameter. Together, said cylindrical surface 234 or 334 and cylinder face 232 or 332 define a compressor cylinder portion 230 or 330 adapted to receive said compressor portion 220 or 320 of said piston head portion 202 or 302. Together, said compressor piston portion 220 or 320 and said compressor cylinder portion 230 or 330 comprise a variable volume compressor chamber 240 or 340, said volume being determined by the position of translation of the piston portion 220 or 320 relative to the compressor cylinder portion 230 or 330.

Similarly, the expander cylinder portion 270 or 370 of the respective first or second cylinder 204 or 304 has a cylinder face 272 or 372 configured to mate with expander face 264 or 364 of the respective expander portion 260 or 360 of piston head portion 202 or 302. Said expander cylinder head portion 270 or 370 further includes cylindrical surface 274 or 374 coaxial with said longitudinal axis 194, extending medially of said cylinder face 272 or 372 and having said second diameter. Together, said cylinder face 272 or 372 and said cylindrical surface 274 or 374 defines said expander cylinder portion 270 or 370 adapted to receive expander portion 260 or 360 of piston head portion 202 or 302. Together, said expander cylinder portion 270 or 370 and said expander piston portion 260 or 360 define a variable volume mechanical expander chamber 280 or 380, said volume being determined by the position of translation of piston portion 260 and 360 relative to expander cylinder portion 270 or 370.

As previously described, connecting rod 192 joins said first and second piston head portions 202 and 302 to form a unitary piston assembly 190. This unitary construction allows the respective first and second compressor chambers 240 and 340 and first and second expander chambers 280 and 380 to vary in volume in a coordinated manner in response to reciprocating motion of piston assembly 190 along longitudinal axis 194.

The reciprocating motion of piston assembly 190 within said first and second cylinders 204 and 304 is particularly shown in the sequence of operating conditions shown by FIGS. 10-13. These figures show in schematic representation the variable volume first and second compressor chambers 240 and 340 and the variable volume first and second expander chambers 280 and 380 changing in volume in response to translational motion of piston assembly 190 relative to first ahd second cylinders 204 and 304.

FIG. 10 shows piston assembly 190 moving in the direction of arrow 196 along longitudinal axis 194 such that second piston head portion 302 is moving inwardly with respect to second cylinder 304 and first piston head portion 202 is moving outwardly with respect to first cylinder 204. This particular motion coincides with first expansion chamber 280 of first mechanical expander 250 receiving heated air 82 having an increased pressure and causing outwardly motion of the expander portion 260 of first piston head portion 202. Concurrently, the outward motion of first piston head portion 202 is translated by connecting rod 192 into inward motion of second piston head portion 302 into second cylinder 304 such that second compression chamber 340 of second compressor 310 is decreasing in volume causing compression within said chamber. As will be further described, this motion concurrently causes environmental air 80 to be drawn into first compressor 210 and heated air 82 to be exhausted from second expander 350.

FIG. 11 shows piston assembly 190 translated to one extreme end condition of its reciprocating motion such that first piston head portion 202 is in bottom-dead-center condition with respect to first cylinder 204 thereby causing first compressor chamber 240 and first expander chamber 280 to be in their most fully expanded, largest volume condition. Conversly, second piston head portion 302 is fully translated into second cylinder portion 304 to a top-dead-center position causing said second compressor chamber 340 and said second expander chamber 380 to be in their most fully compressed condition.

FIG. 12 shows piston assembly 190 moving in the direction of arrow 198 along longitudinal axis 194 such that first piston head portion 202 is moving inwardly with respect to first cylinder 204 and second piston head portion 302 is moving outwardly with respect to second cylinder 304. This particular motion coincides with second expansion chamber 380 of second mechanical expander 350 receiving heated air 82 having an increased pressure and causing outwardly motion of the expander portion 360 of second piston head portion 302. Concurrently, the outward motion of second piston head portion 302 is translated by connecting rod 192 into inward motion of first piston head portion 202 into first cylinder 204 such that first compression chamber 240 of first compressor 210 is decreasing in volume causing compression within said chamber. As will be further described, this motion concurrently causes environmental air 80 to be drawn into second compressor 310 and heated air 82 to be exhausted from first expander 250.

FIG. 13 shows piston assembly 190 translated to another extreme end condition of its reciprocating motion such that second piston head portion 302 is in bottom-dead-center condition with respect to second cylinder 304 thereby causing second compressor chamber 340 and second expander chamber 380 to be in their most fully expanded, largest volume condition. Conversly, first piston head portion 202 is fully translated into first cylinder portion 204 to a top-dead-center position causing said first compressor chamber 240 and said first expander chamber 280 to be in their most fully compressed condition.

Exhaust heat recuperating means 180 are provided for receiving heated air 84 exhausted from said first and second mechanical expanders 250 and 350 and delivering that heated air 84 to recuperator chamber 50 wherein it heats the air 80 contained within the recuperator portion 140 of each of said multiple heat exchanger tubes 130. Said exhaust heat recuperating means 180 comprises first and second exhaust ducts 182 and 184 connected with exhaust valve 440 of said first and second mechanical expanders, respectively.

FIGS. 21 and 22 illustrate in more detail a slightly modified heat engine relative to the heat engine shown in FIG. 9. FIG. 21 shows first heat engine 200 or second heat engine 300 having the respective piston head portion 202 or 302 of piston assembly 190 in top-dead-center position. FIG. 22 shows the same heat engine 200 or 300 with the respective piston head portion 202 or 302 in bottom-dead-center position. The mechanical expander 250 or 350 and the compressor 210 or 310 of the modified heat engine is functionally equivalent to the heat engine of FIG. 9 with certain design variations such as the beveled expander face 266 or 366 previously described and the inclusion of valve means 400 as will be further described.

Referring to FIG. 22, the following description will be in reference to a modified first heat engine 200 although the descriptions would equally apply to a second heat engine 300 which, in the preferred embodiment, would be specifically contemplated to be a symetric or mirror-image reproduction of the first heat engine 200 at the opposing end of connecting rod 192. In this first heat engine 200, first compressor chamber 240 is shown and is defined by a variable volume cylinder of a first diameter having compressor cylinder portion 230 as the radially outward wall, cylinder face 232 as one end wall, and compressor face 224 of compressor piston portion 220 as the other end wall. Sealing means in the form of piston rings 242 as known in the art of piston and cylinder assemblies are provided at the distal end 228 of compressor portion 220 of piston head portion 202. Rings or seals 242 functionally engage the radially inward cylindrical surface 234 of compressor cylinder portion 230 allowing motion of piston head 202 from top-dead-center position to bottom-dead-center position within compressor cylinder portion 230 while preventing leakage of working fluid between cylindrical surface 222 of compressor piston portion 220 and cylindrical surface 234 of compressor cylinder portion 230.

Similarly, first expander chamber 280 is defined by a hollow cylinder having ring-shaped bevel expander face 266 of expander portion 260 of piston head 202 as one face, the mating ring-shaped bevel cylinder face 272 of expander cylinder portion 270 as the other end face, the radially inward cylindrical surface 274 of expander cylinder portion 270 as the radially outward surface having said second diameter, and the radially outward cylindrical surface 222 of compressor piston portion 220 extending medially of compressor cylinder portion 230 as the radially inward surface having said first diameter.

Multiple piston rings or seals 282 are provided at the distal end 268 of the cylindrical surface 262 of expander portion 260 of piston head portion 202 for engaging with the cylindrical surface 274 of expander cylinder portion 270 and thereby sealing working fluid within the variable volume expander chamber 280 during reciprocating motion of piston head portion 202 along longitudinal axis 194.

Expander cylinder portion 270 is particularly designed to mate with and receive expander piston portion 260 thereby allowing reciprocating motion of piston head 202 along longitudinal axis 194 with respect to cylinder 204 from a bottom-dead-center position to a top-dead-center position allowing concurrent variation in volume in compressor chamber 240 and expander chamber 280.

Valve means 400 including respective control means are provided for controlling the flow of working fluid 80 into and out of the respective compressor and expander chambers 240 and 280. Cylinder face 232 of compressor cylinder portion 230 is provided with inlet valve 410 which, in the preferred embodiment, is a one-way valve allowing working fluid, particularly air 80 from the surrounding environment 75 to be drawn into the compressor chamber 240 as the compressor chamber is expanded by the piston head portion 202 translating from top-dead-center position to bottom-dead-center position. Inlet valve 410 may be a reed valve, a spring-loaded flange and collar valve, or similar valve known in the art for allowing a working fluid to pass in only one direction upon the creation of a pressure gradient across the valve in that direction. As particularly shown in FIG. 21, inlet valve 410 comprises a circular flange 412 seated on a valve seat 414 and biased into seated condition by spiral spring 416. Motion of piston head 202 from top-dead-center position shown in FIG. 21 to bottom-dead-center position shown in FIG. 22 causes compressor chamber 240 to be enlarged and a pressure gradient to form between air 80 in the surrounding environment 75 at ambient temperature and pressure and the air 80 contained within the compressor chamber 240 at a decreasing pressure. This pressure gradient or vacuum causes air 80 from the environment 75 to pass through a porous air cleaner 418, overcome spring 416 thereby lifting flange 412 off of valve seat 414, and thereby pass between flange 412 and valve seat 414 into compressor chamber 240. Motion of piston head portion 204 from bottom-dead-center position to top-dead-center position creates a reverse pressure gradient whereby the pressure of air 80 contained within compressor chamber 240 increases and exceeds the ambient pressure of the environment 75 thus assisting spring 416 in urging flange 412 against seat 414 and thereby preventing air from exiting compressor chamber 240 through inlet valve 410. In this manner, inlet valve 410 operates as an automatic one-way inlet valve.

An output valve 420 is also provided on cylinder face 232 of compressor cylinder portion 230 as shown in FIG. 22. Output valve 420 is a one-way automatic valve similar to inlet valve 410, but having a reverse orientation. Output valve 420 comprises a flange 422 seated upon a valve seat 424 biased by spring 426 to maintain flange 422 in a seated and sealed position with respect to valve seat 424. Output valve 420 is oriented to open in response to a pressure gradient between compressor chamber 240 and first recuperator portion interconnection tube 162. Accordingly, motion of piston head 202 from bottom-dead-center position wherein compressor chamber 240 is filled with air 80 taken from the environment 75 at substantially ambient temperature and pressure to top-dead-center position causes said air 80 to be compressed to a first pressure in excess of the pressure of air 80 contained within first recuperator portion interconnection tube 162 thereby creating a pressure gradient which elevates flange 412 relative to valve seat 414 overcoming spring 416 and allowing air compressed by compressor chamber 240 to pass between flange 412 and valve seat 414 into first recuperator portion interconnection tube 162 for delivery to the recuperator stage 112 of heat exchanger means 100. Upon subsequent motion of piston head portion 202 from top-dead-center position to bottom-dead-center position, the pressure gradient is reversed and flange 412 moves toward valve seat 414 in response to urging of spring 416 thereby sealing output valve 420 and preventing air 80 from flowing from first recuperator portion interconnection tube 162 into compressor chamber 240. In this manner, output valve 420 acts as a one-way valve causing air compressed by first compressor 210 to be delivered to heat exchanger means 100.

Mechanical expander 250 is provided with valve means 400 to control the flow of the heated air 82 from heat exchanger means 100 into expander chamber 280 and to control the exhaust of fully expanded heated air 84 from expander chamber 280 into exhaust heat recuperator means 180 through first exhaust duct 182. Valve means 400 includes input valve 430 comprising a flange 432 sealably positioned upon a valve seat 434 and biased by spring 436 into said seated and sealed condition. Input valve 430 is further provided with control means which in the preferred embodiment comprises a solenoid 438 which operates in response to a pressure sensing means connected with first two-stage heat exchanger 110. Input valve 430 has a normally-closed position wherein flange 432 is biased by spring 436 into sealing engagement with seat 434. Achievement of a predetermined peak pressure by the heated air 82 contained within the first two-stage heat exchanger 110 sensed by the pressure sensing means causes solenoid 438 to open input valve 430 thereby allowing heated air 82 having a second, higher pressure and temperature to enter expander chamber 280 and cause piston head portion 202 to be moved or expanded from top-dead-center position shown in FIG. 21 to bottom-dead-center position shown in FIG. 22. Such motion concurrently causes compression of second compressor 310 positioned at the opposite end of connecting rod 192 and further causes motion of a load thereby performing useful work. Upon reaching bottom-dead-center position, said control means causes solenoid 438 to allow input valve 430 to close thereby reseating flange 432 upon valve seat 434. The control means maintains the input valve 430 in said closed position until the piston head portion 202 has again obtained top-dead-center position in response to expansion occuring in second mechanical expander 250 at the opposing end of connecting rod 192 and pressure within said first two-stage heat exchanger 110 again acquiring said predetermined peak pressure.

Exhaust valve 440 is provided and configured similar to input valve 430. Exhaust valve 440 comprises flange 442 seated against valve seat 444 and biased into that seated condition by spring 446. Exhaust valve 440 has a normally-closed condition in response to spring 446. Control means are provided which include solenoid 448 for opening exhaust valve 440 by overcoming spring 446 and lifting flange 442 from valve seat 444 thereby allowing fully expanded heated air 84 to flow between flange 442 and seat 444 from expander chamber 280 into first exhaust duct 182. Said control means causes exhuast valve 440 to open at the same time that the input valve 430 of the second mechanical expander 250 is opened. In other words, when pressure sensing means associated with the second two-stage heat exchanger 120 senses the attainment of said predetermined peak pressure, said control means opens both the input valve 430 of second mechanical expander 350 to allow expansion of second expander chamber 380 and exhuast valve 440 of first mechanical expander 250 to allow exhaust of fully expanded heated air 84 from first expander chamber 280. Accordingly, exhaust valve 440 remains open while the respective piston head portion 202 travels from bottom-dead-center position shown in FIG. 22 to the top-dead-center position shown in FIG. 21 at which time the control means closes both the input valve 430 of second mechanical expander 350 and the exhaust valve 440 of the first mechanical expander 250. In this manner, said control means causes said piston assembly 190 to have an intermittent reciprocating motion between two extreme positions along longitudinal axis 194, each of the translating motions being initiated by air contained within one of said heat exchanger means 110 and 120 attaining said predetermined peak pressure.

The system of said first and second heat engines 200 and 300 and said first and second two-stage heat exchangers 110 and 120 is further defined as follows. Said first recuperator portion interconnecting tube 162 extending through chamber end wall 51 is connected with output valve 420 of first compressor 210 such that air 80 from the environment 75 and compressed by first compressor 210 is delivered to first two-stage heat exchanger 110. Within said heat exchanger, the air 80 ascends the recuperator portion 140 of the multiple heat exchanger tubes 130 wherein it receives a first quantum of heat transferred to it from hot air 84 previously exhausted from the first and second heat engines 200 and 300. In response to a subsequent cylce of the heat engine which causes an additional quantity of air 80 to be compressed and delivered to first two-stage heat exchanger 110, the air 80 contained in the recuperator portion 140 of the heat exchanger tubes 130 continues within said tubes through the multiple apertures 45 in heat boundary wall 44 and descends the collector portion 150 of said tubes. Within the collector portion 150, the air 80 receives a second quantum of heat transferred to it from solar radiation focused by solar collector 20 onto the exterior of collector portion 150 of each of said tubes 130. The heated air 82 contained within said tubes continues to receive heat and build up pressure within the fixed volume of said tubes until a pre-determined peak pressure is attained at which time the input valve 430 of the first expander 250 opens and the heated air 82 contained within the collector portion 150 of said heat exchanger tubes 130 is delivered by first collector portion interconnector tube 166 through first chamber end wall 51 and through input valve 430 into first expander 250. After full expansion, input valve 430 closes and exhaust valve 440 opens to allow the fully by expanded heated air 84 which has performed useful work by expanding said first expander 250 to be exhausted from first expander 250 into exhaust heat recuperator means 180, specifically first exhaust duct 182, wherein it is delivered to recuperator chamber 50 exteriorly of said recuperator portion 140 of said multiple heat exchanger tubes 130 such that heat may be transferred from exhaust air 84 having a temperature greater than ambient temperature through said heat exchanger tubes 130 to air 80 contained therein. Exhaust air 84 contained within recuperator chamber 50 flows upward through said chamber and is eventually exhausted through said multiple apertures 45 of heat boundary wall 44 flowing around the multiple heat exchanger tubes 130 as they pass through said apertures 45. This flow occurs in response to additional heated air 84 being exhausted by said first and second mechanical expanders 250 and 350 and delivered to said recuperator chamber 50 by exhaust heat recuperator means 180.

Although the foregoing description of the hot air engine portion of the present invention has been described relative to a first heat engine 200 in a modified form shown in FIGS. 21 and 22, it is to be understood that each portion of said engine is symetrically repeated in a second, interconnected heat engine 300 associated with second two-stage heat exchanger 120 and interconnected with said first heat engine 200 by the common piston assembly 190, particularly connector rod 192. Each engine portion referenced above as having a 200 series number (200-299) has an equivalent portion in second heat engine 300 and is designated in the drawings by a corresponding 300 series number (300-399).

OPTIONAL HEATER

The present invention may also include an auxilliary heating meahs, optional heater 500. As schematically illustrated in FIG. 14, the heater 500 is interposed between the mechanical expanders 250 and 350 and recuperator chamber 50 for heating fully expanded heated air 84 being exhausted by said mechanical expanders 250 and 350. Said optional heater 500 is shown in FIGS. 5-7 and more specifically comprises gas tube 510, gas valve 520, and gas jets 530. Gas tube 510 delivers a hydrocarbon fuel such as natural gas from an external fuel supply to the recuperator chamber 50 for combustion. Said gas tube 510 includes a valve 520 which may selectively control the flow of natural gas within gas tube 510. Gas tube 510 enters the plenum of recuperator chamber 50 through aperture 57 in chamber bottom wall 56. The portion of gas tube 510 located within the plenum of recuperator chamber 50 is provided with multiple fuel burning jets 530 interspaced along the length of the gas tube 510 and being adapted in a manner known in the art for burning hydrocarbon fuel within the recuperator chamber 50 using the heated air exhausted by first and second mechanical expanders 250 and 350 and delivered to first and second chamber end walls 51 and 52 by first and second exhaust ducts 182 and 184, respectively. In this configuration, heater 500 within recuperator chamber 50 operates as a furnace for burning a hydrocarbon fuel and using the heat generated thereby for heating a working fluid 80 contained within multiple heat exchanger tubes 130.

It is particularly contemplated that the heater 500 may either assist the solar collector in its production of useful work or may replace the solar collection during the hours in which sunlight is not available, for those applications of the hot air solar engine in which 24-hour operation is desired.

OPTIMUM DESIGN CHARACTERISTICS

Certain design parameters may be selected to allow efficient operation of the hot air solar engine. Some of these design characteristics are described by the performance bounds shown in FIG. 20 and described later. Other design parameters can be determined from the physical layout of the hot air solar engine.

One such design parameter is the relationship between the size of the compressor 210 or 310 and the size of the mechanical expander 250 or 350. In order for equilibrium to be maintained during operation, the compressor 210 or 310 must deliver the same amount of air in one stroke as is removed by one stroke of the mechanical expander 250 or 350. Further, the expander 250 or 350 must have a mechanical advantage over the compressor 210 or 310 so that expansion by one of said first or second mechanical expanders 250 and 350 will fully compress the air contained within the opposing first or second compressor 310 or 210. It is desirable for that mechanical advantage to be as large as feasible in order for the reciprocating motion of piston assembly 190 to do useful work by driving a separate mechanical load such as a generator for generating electricity, a water pump, or the like. The excess force exerted on the piston assembly 100 by the heated air 82 contained within one mechanical expander 250 or 350 over the force of compressing air 80 within the opposing compressor 310 or 210 is the force available to drive the load and produce useful work.

The mechanical advantage is a function of the ratio of the cross-sectional areas of the mechanical expander and mechanical compressor. In the case of the planar face of the cylindrical piston portion of the compressors 210 and 310 the area of the compressors is a function of said first diameter and the force required to compress air within said compressor is a product of the compressor area and the peak pressure to be generated within the compressor, $P_2$ (the pressure calculated for state (2) in FIG. 15). For the expander 250 or 350, particularly as shown in FIGS. 21 and 22, the area of the expander is calculated according to the cross-sectional area of the expander chamber 280 or 380 projected on a plane perpendicular to the longitudinal axis 194. That area would be calculated as the area of a planar ring, specifically, the area of a circle having said second diameter less the area of a circle having said first diameter. The force imposed upon the piston head portion 202 or 302 by heated air 82 within said mechanical expander 250 or 350 would be the product of the pressure of the heated air 82 and the area of the expander portion piston face 264 or 364 or chamber, as just described. The force available for driving a load and producing useful work would thus be the difference between the force upon the piston assembly 190 from the mechanical expander 250 or 350 less the force necessary for piston assembly 190 to compress air contained within first compressor 210 or 310.

The contrasting design parameter for the optimum ratio between the compressor 210 and 310 and the mechanical expander 250 and 350 is the quantity of air to be delivered or received by the compressor chambers 240 or 340 and the expander chambers 280 and 380 such that the quantity of air contained within heat exchanger means 100 remains constant during prolonged operation of the hot air solar engine. Accordingly, the volume of compressor chamber 240 relative to the volume of expander chamber 280 must be such that the mass of air displaced by the volume of compressor chamber 240 at ambient temperature and pressure $T_1$ and $P_1$ (see state (1) of FIG. 15) is equivalent to the mass of air received by expander chamber 280 when fully expanded, $P_9$ and $T_9$ (see state (9) of FIG. 15). This ratio would vary according to the predetermined peak operating temperature and pressure $P_8$ and $T_8$ and would also impact on the cycle time necessary for sufficient heat to be collected by the heat exchanger means 100 to attain the peak operating pressure and temperature necessary to open input valve 430 of the first and second mechanical expanders 250 and 350. Since the piston portion of each chamber must have equal strokes in order to accomplish a unitary construction, these volumes are variable only as a function of the projected areas of the piston faces as just described and thus a function of said first and second diameters.

The bottom of FIG. 15 indicates the optimum design points for the preferred embodiment wherein the peak design temperature attained ($T_8$) is 1450° R. In this preferred embodiment, assuming a 90% efficiency of adiabatic expansion and compression and a 90% volumetric efficiency for the expander and compressor, the optimum compressor pressure ratio is 2.5 and the optimum expander pressure ratio is 3.53. Under these design conditions, the hot air solar engine would have an expander-compressor mechanical advantage ratio of 2.12, a power generator of 76.2 horsepower per pound per second of airflow and a thermal efficiency of 30 percent.

Using these optimum design calculations, a one kilowatt (1 kW) hot air solar engine could be fabricated using a cylindrical paraboloid reflector 34, previously described, having a projected area of 6 feet × 8 feet. The core for this collector would have an aperture 62 in collector chamber 60 approximately 1.5 inches wide and 6 feet long. The collector core 40 would contain twenty tubes having a 0.5 inch diameter. For the first and second heat engines 200 and 300, the compressor portions 210 and 310 would have a 6 inch bore (said first diameter) and 4 inch stroke. The mechanical expanders 250 and 350 would have a 10.6 inch bore (said second diameter) and the corresponding 4 inch stroke. With the previously described pressure ratios for the compressor and expander, a 2.12 expander to compressor swept volume ratio results. At a peak operating temperature of 1450° R., a one kilowatt hot air solar engine would experience a speed of translation of the piston assembly 190 of only 40 feet per minute and a rate of one cycle per second. This low speed, high power mode of operation would experience minimal piston wear and long life. Further, using the optional heating means 500 previously described, 24-hour operation could be achieved using 8 hours solar power and 16 hours of natural gas or other hydrocarbon fuel power at a consumption rate of 0.32 lb/hr per HP to achieve an average fuel consumption of about 0.2 lb/hr per HP.

THERMODYNAMIC CYCLE

Figure 17:
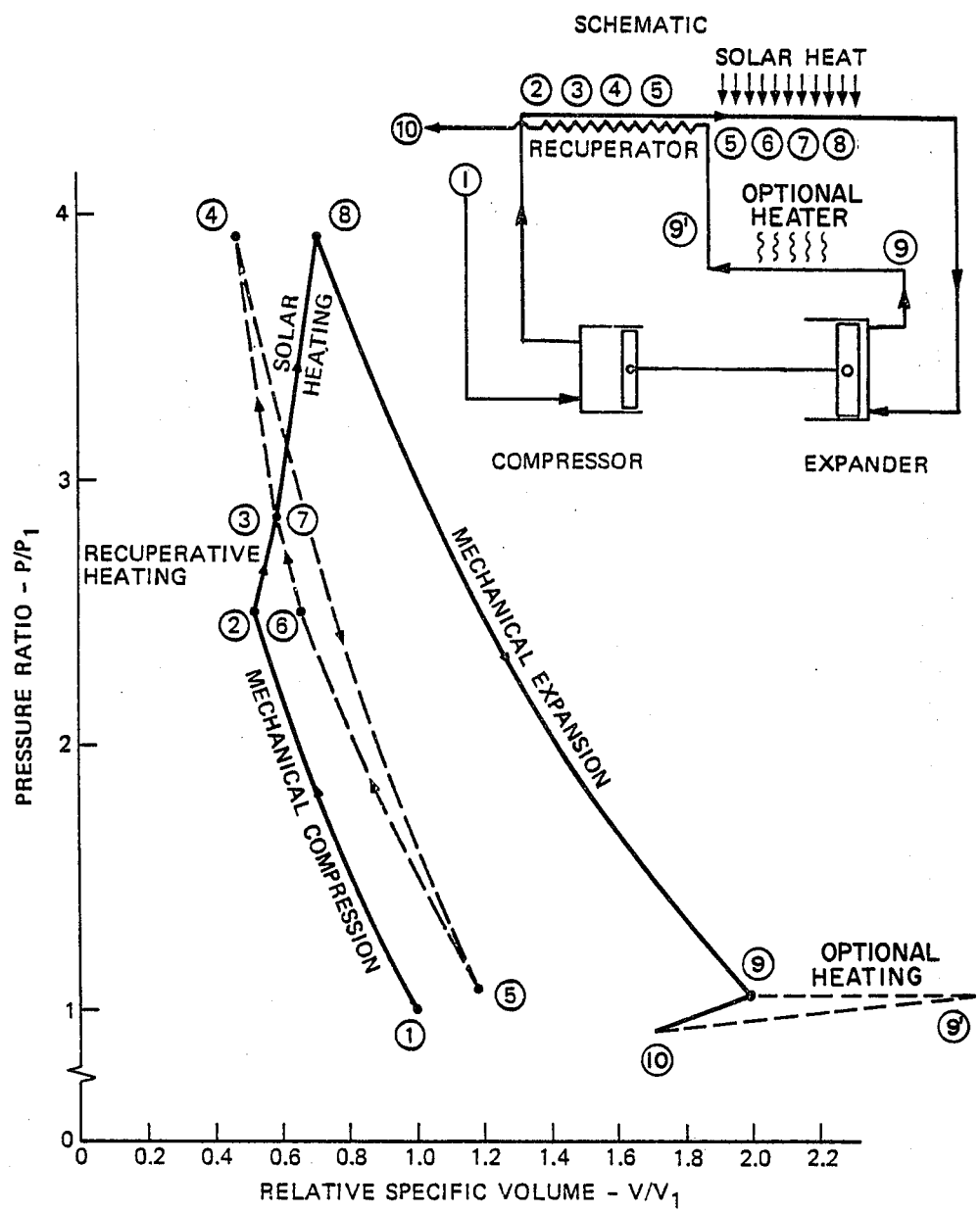
FIG. 17 is a pressure-volume diagram of the hot air solar engine system of FIG. 14.

FIGS. 14 and 17 show a schematic representation of the basic components of the hot air solar engine of the present invention. The schematically shown apparatus of FIG. 14 represents one-half of the total system and apparatus of the preferred embodiment and specifically comprises first compressor 210, first two-stage heat exchanger 110 having recuperator portion 140 and collector portion 150, first expander 250, optional heater 500, and exhaust heat recuperating means 180 including exhaust ducts 182 and 184 and recuperator chamber 50. The schematic diagram of FIG. 14 is further provided with circled numbers (1)–(10) indicating states that the working fluid acquires during the course of operation of the heat engine.

In the preferred embodiment, the working fluid is air 80 drawn in by the compressor 210 or 310 from the surrounding atmosphere 75 at ambient temperature and pressure, indicated as state (1). Compressor 210 or 310 compresses air 80 to a first, higher pressure indicated by state (2) and delivers that air 80 to the recuperator portion 140 of the respective heat exchanger 110 or 120. Air 80 contained in the recuperator portion 140 receives heat from hot air 84 exhausted from mechanical expanders 250 and 350 and circulating external of heat exchanger tubes 130. Heat is transferred from exhaust air 84 having a higher temperature through the wall of said tubes 130 thereby raising the specific heat, temperature, and pressure of the air 80 within said tubes to state (3). Concurrently, radiant heat is being absorbed in the collector portion 150 of the heat exhanger 110 or 120 causing further increase in the pressure of the air contained within the fixed volume of the heat exchanger means 100 to a higher level indicated by state (4). Upon attaining the peak pressure associated with state (4), the input valve 430 of expander 250 or 350 opens and heated air 82 from heat exchanger 110 or 120 causes the expander piston portion 260 or 360 to be moved from the top-dead-center position to the bottom-dead-center position thereby causing mechanical expansion of the expander chamber 280 or 380 and useful work to be produced. Said expansion causes the air 80 remaining in the balance of the heat exchanger 110 or 120 particularly in the recuperator portion 140, to be partially expanded to a lower pressure indicated by state (5).

In response to expansion by the opposing expander 350 or 250, additional air 80 is compressed by compressor 210 or 310 and delivered to recuperator portion 140 thereby causing air 80 previously contained in recuperator portion 140 to be transferred to collector portion 150 and be compressed to a higher pressure indicated by state (6). The new air 80 in the recuperator portion 140 of the heat exchanger tubes 130 is similarly heated by exhaust hot air 84 to a higher temperature and pressure which, in turn, pressurizes the air 80 contained in said collector portion 150 to a higher pressure indicated by state (7). Concurrently, the air 80 contained in said collector portion 150 receives heat from concentrated solar radiation 36 being focused upon the exterior of the collector portions 150 of heat exchanger tubes 130, the heat of that radiation being transmitted through said tubes to the air 80 contained therein. In response to the heat received from said solar radiation 36, the air 80 contained in said heat exchanger tubes 130 increases in temperature and pressure to peak pressure, state (8), at which point inlet valve 430 of expander 250 or 350 allows said heated air 82 at said increased temperature and pressure to be released into expander 250 or 350 causing mechanical expansion of the expander and thereby performing useful work.

Subsequent to the mechanical expansion in expander 250 or 350, the air 84 is released through exhaust valve 440 to the exhaust heat recuperative means 180 in a reduced pressure state indicated by state (9) at which time the fully expanded exhaust air 84 is delivered by first or second exhaust duct 182 or 184 to the recuperator chamber 50 wherein exhaust air 84 circulates about the recuperator portions 140 of heat exchanger tubes 130 containing cooler air 80 and heat is transferred from said exhaust air 84 to the air 80 contained within said tubes 130. Exhaust air 84 then returns to the environment through multiple apertures 45 around heat exchanger tubes 130 as they pass through heat boundary wall 44. The exhaust air 84 at this point has imparted some of its heat to the air contained within the heat exchanger tubes 130 and thus has acquired an exhaust temperature and ambient pressure indicated by state (10).

Referring to FIG. 15, the series of five cross-hatched bars indicate the working fluid or air 80 contained within the fixed-volume heat exchanger means 100. Portions of the bars are labeled (2)–(8) indicating the previously described states of the air 80 contained within heat exchanger means 100. The portion of each bar left of the center line 145 indicates air 80 contained in recuperator portions 140 of the heat exchanger tubes 130, and the portion of the bars to the right of the center line 145 indicates air 80 contained in the collector portions 150 of the heat exchanger tubes 130. The center line 145 corresponds with the location on the heat exchanger tubes 130 where they pass through and are bisected by the multiple apertures 45 of heat boundary wall 44, passing from recuperator chamber 46 to collector chamber 60.

FIG. 15 further contains a chart indicating the state variables pressure, temperature, and specific volume for each of the states (1)–(10) of the air 80 as it passes through the system.

FIG. 16 provides the pressure history of the air contained in the heat exchanger tubes 130 in the lower half of the diagram. The upper half of the diagram shows the temperature history of the air contained in the recuperator portion 140 indicated by the solid line connecting states (1)–(5) and in the collector portion 150 indicated by the dashed line connecting states (5)–(9).

Figure 18:
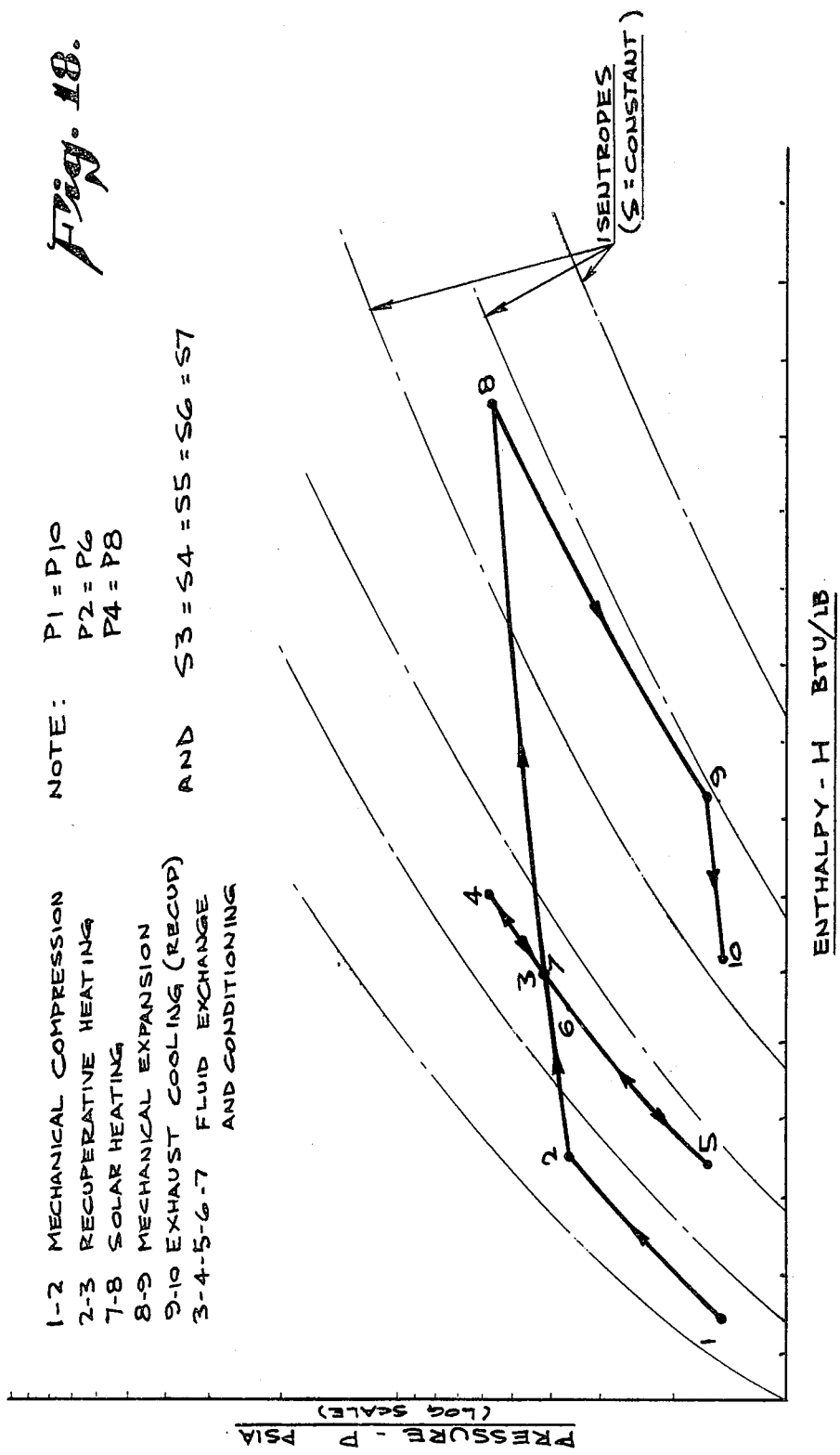
FIG. 18 is a pressure-enthalpy diagram of the hot air solar engine system of FIG. 14.
Figure 19:
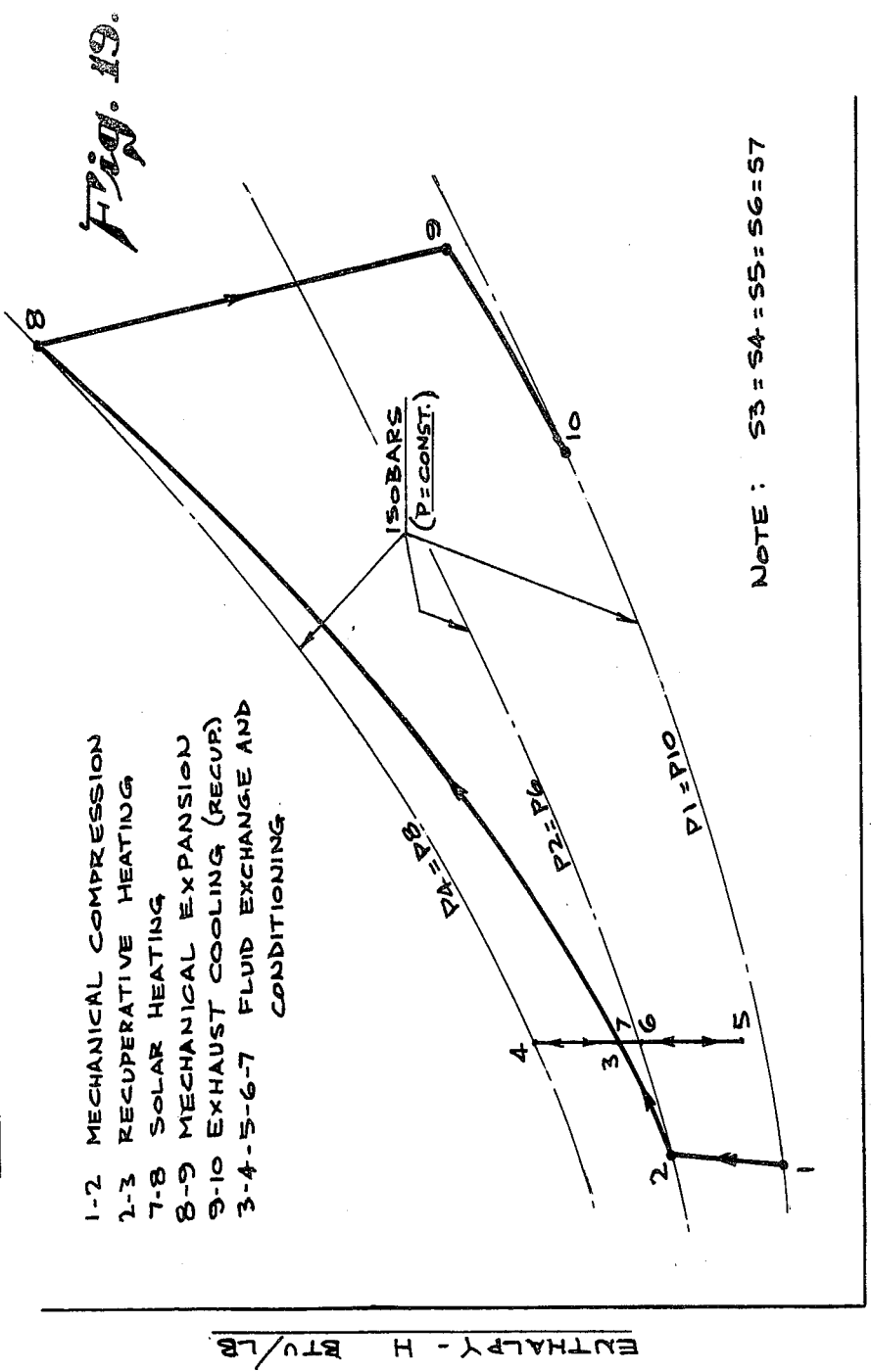
FIG. 19 is an enthalpy-entropy diagram of the hot air solar engine system of FIG. 14.

FIG. 17 is a pressure-volume diagram for a specific quantity of air 80 as it passes through the schematically shown system of the present invention. FIGS. 18 and 19 are pressure-enthalpy and enthalpy-entropy diagrams for the thermodynamic cycle. Together these diagrams fully describe the thermodynamic qualities of the hot air solar engine cycle.

The enthalpy-entropy diagram of FIG. 19 particularly shows that the cycle of operation through states (3)–(7) all occur at a constant specific entropy. This cycle of states corresponds with the fact that the thermodynamic system presently described requires two cycles of the heat engine to pass a single quantity of working fluid 80 from the compressor 210 or 310 to the mechanical expander 250 or 350. The previously described optimum design conditions indicate that the displacement of the compressor, the displacement of the mechanical expander and the volume of the heat exchanger means connecting the compressor and the expander are predetermined so that when the hot air solar engine is operating in a state of equilibrium, an identical mass of air is compressed and delivered to the heat exchanger means 100 by the respective compressor 210 or 310 as is removed from the heat exchanger means 100 by the respective mechanical expanders 250 or 350. Further, the fixed volume of the heat exchanger means 100 contains a mass of air equal to twice the mass of air 80 delivered by a stroke of the compressor 210 or 310 and removed by a stroke of the expander 250 or 350.

Since the heat exchanger means 100 having this double capacity is comprised of multiple parallel tubes having a relatively narrow diameter in relation to their longitudinal length, these tubes may, for analysis purposes, be considered as if they were divided in half having a definitive boundary which substantially coincides with the physical location of the heat boundary wall 44 with respect to the separation of the recuperator portion 140 and the collector portion 150 of each of the heat exchanger tubes 130. In operation, any thermodynamic boundary between the recuperator portions 140 and the collector portions 150 during the thermodynamic cycle is a floating boundary 147 having a moveable position relative to the physical bisecting boundary of the heat boundary wall 44. This can particularly be seen in the cross-hatched bars of FIG. 15. This figure includes a center line 145 corresponding with the physical boundary indicated by the heat boundary wall 44 bisecting each of the heat exchanger tubes 130. Included in the cross-hatched bars is a distinction between the two quantities of air contained within heat exchanger means 100 and showing a floating boundary 147 between first and second quantities of air contained within the heat exchanger means 100. The succession of bars shows how that boundary moves relative to the center line 145 during the interim thermodynamic cycling that occurs in the heat engine.

FIG. 19 further shows this interim cycling where a specific quantity of air inserted into heat exchanger means 100 goes through a series of mechanical expansions and contractions comprising a closed thermodynamic loop totally contained within heat exchanger means 100. Accordingly, each of the states (3)-(7) is at a constant specific entropy. FIG. 17 shows on a pressure-volume diagram the closed loop of this series of states and it should be understood that for analysis of the work being generated by this thermodynamic cycle, this closed loop may be dropped from the cycle. Accordingly, the power loop of the thermodynamic cycle of the present invention is shown by the loop (1)-(2)-(3/7)-(8)-(9)-(10)-(1). The loop associated with the interim thermodynamic cycle can be called a fluid exchange and conditioning loop and comprises the loop of states (3)-(4)-(5)-(6)-(7). Although the conditioning and exchange loop may be dropped from the thermodynamic cycle for power analysis purposes, this loop is necessary and specifically contemplated by the present invention in order for the heat exchanger means 100 to be physically configured into two stages utilizing two heat sources and having increased efficiency.

With the double volume heat exchanger, state (5) becomes the "exchange point" of the thermodynamic cycle at which the air delivered by the compressor 210 or 310 in one cycle becomes the air to be expanded in the mechanical expander 250 or 350 during the next cycle. In FIG. 15, this exchange point is shown by the first and last cross-hatched bars extending throughout the entire heat exchanger means 100 indicating how mechanical expansion of the first cycle has removed a quantity of air compressed by a previous cycle thereby allowing the most recently compressed quantity of air to expand from the recuperator portion 150 to fill both portions of the heat exchanger means 100 and then be subsequently compressed into the collector portion 150 by the compression and delivery of air during the second cycle of the heat engine. In this manner, states (3) and (7) are identical since equal amounts of compression air and expansion air are present in the tubes 130.

Figure 20:
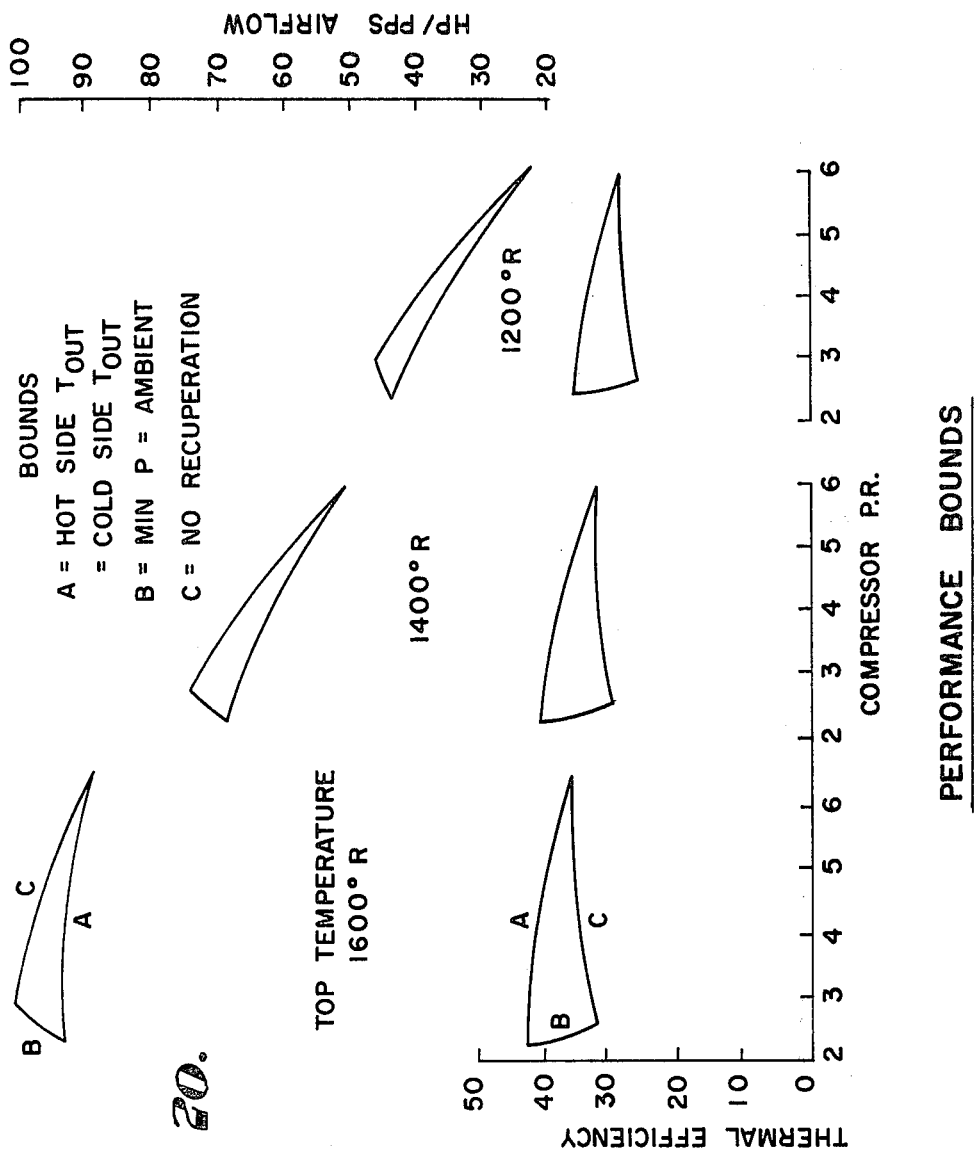
FIG. 20 is a diagram of the thermodynamic performance bounds of the hot air solar engine system of FIG. 14.
Figure 24:
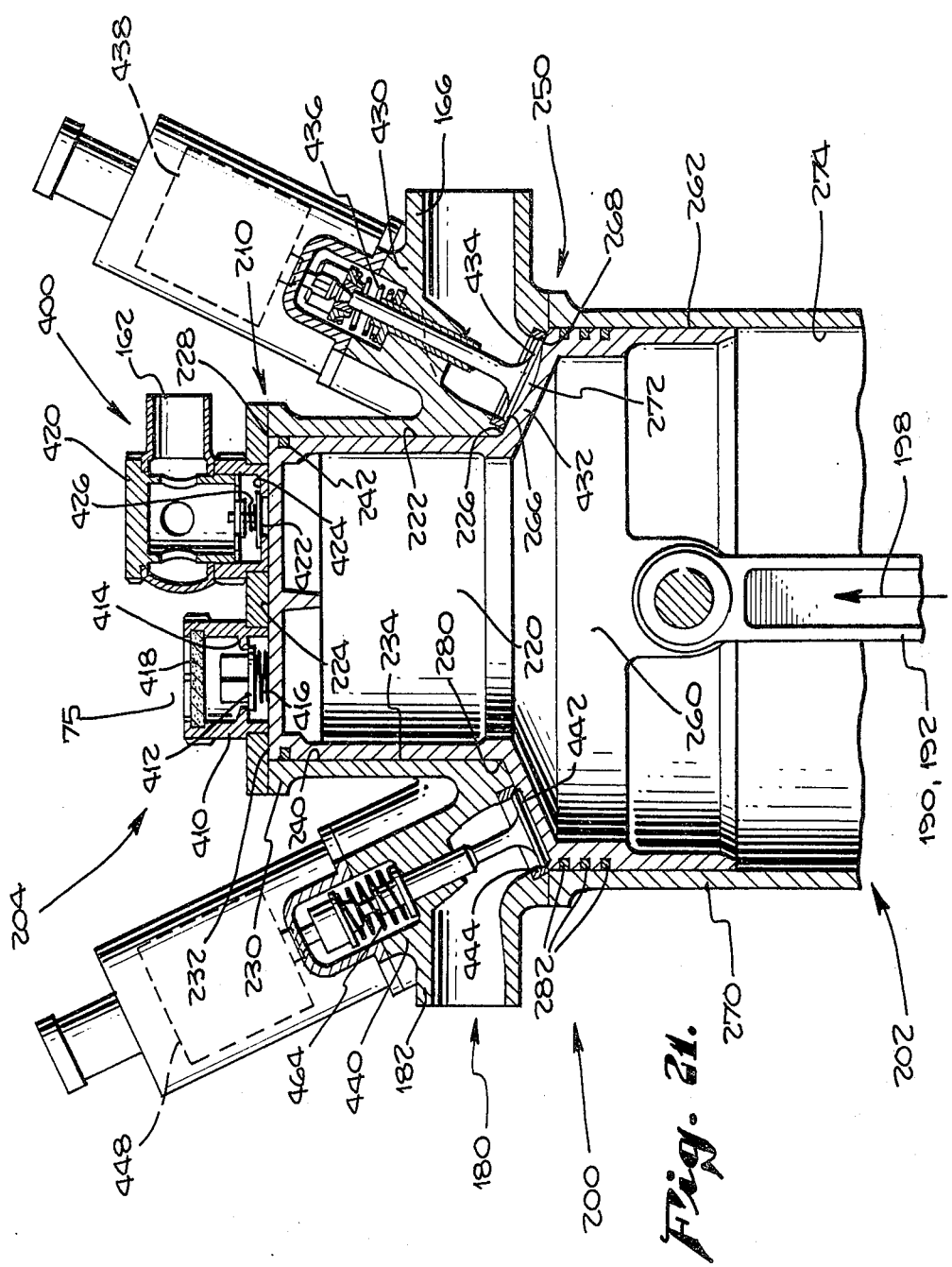

FIG. 20 diagrams performance bounds curves for the thermodynamic cycle of the present invention. The lower portion of the diagram indicates the thermal efficiency achieved and the design limitations at three different peak operating temperatures and various pressure ratios for the compressor, shown on the horizontal axis. The upper portion of the diagram of FIG. 20 shows the power derived from the working fluid in the form of specific horsepower measured in horsepower per pounds per second of airflow for each of the three peak operating temperatures and compressor pressure ratios.

Three bounds, A, B, and C define an envelope within which design parameters of the hot air solar engine may be selected for optimum design. Bound A corresponds with the condition that the temperature of state (3) (referred to as $T_3$) is equivalent to the temperature of state (10), $T_{10}$. This bound is based on the assumption that the air 80 delivered by the compressor 210 or 310 and located within recuperator chamber 50 is uniformly heated by the hot air 84 exhausted by the expanders 250 and 350. This heat exchange process cannot have any better thermal efficiency than a parallel flow heat exchanger wherein the maximum temperature on the cold side cannot exceed the minimum temperature of the hot side. Accordingly $T_3$ must always be less than or equal to $T_{10}$.

Bound B relates to the possible collapse of heat exchanger tubes when exposed externally to ambient pressure. To avoid the possible collapse condition, the minimum pressure attained within the multiple heat exchanger tubes 130 during a thermodynamic cycle, $P_5$ (the pressure occuring at state (5)) cannot fall below ambient pressure $P_1$. Accordingly, for design purposes, $P_5$ must always be greater than or equal to $P_1$.

Bound C indicates that in order for heat to be recuperated from exhaust air 84 within the recuperator chamber, the exhausted hot air 84 must have a temperature greater than the air 80 contained within the multiple heat exchanger tubes 130. Not only must the temperature of the air exhausted from mechanical expanders 250 and 350 be greater than ambient temperature as previously described, it must be greater than the temperature of air 80 taken from the environment and compressed by compressor 210 or 310. Thus, in operation, the temperature of air delivered by compressor 210 or 310, $T_2$ must be less than or equal to $T_9$. The greater the difference in temperature between $T_1$ and $T_9$, the greater the efficiency of the recuperator stage. At zero efficiency, the limiting values would be that no recuperation has occured and thus $T_2=T_3=T_9=T_{10}$.

The final design bound, as previously mentioned, is that the maximum allowable working pressure $P_8$ cannot exceed the design strength of the multiple heat exchanger tubes 130.

In the previously described alternative embodiment to the present invention which includes the provision of a heater or fuel burning means 500, the thermodynamic cycle is modified for the present invention as shown in FIG. 17 such that exhausted air 84 corresponding with state (9) is heated within the plenum portion of recuperator chamber 50 to an increased temperature indicated by state (9') and thereby imparts additional heat to the air 80 contained within the recuperator portions 140 of heat exchanger tubes 130 thereby allowing partially-solar or non-solar operation of the present invention.

In the foregoing description of the present invention, a preferred embodiment with alternative or optional arrangements of certain features of the invention, have been disclosed. It is to be understood that other mechanical and design variations are possible within the scope of the present invention. For example, the location of the expander and compressor of each hot air engine could be reversed such that the expander portion of each piston head is located toward the distal end of the piston assembly relative to the compressor portion. In this instance, the expander portion would have a first diameter cylindrical surface and the compressor portion would have a second, larger diameter cylindrical surface and the first and second diameters would be defined so that the projected area of each expander face is greater than the projected area of the respective compressor face, giving the expander a mechanical advantage over the compressor. In addition, instead of using an elongated parabolic solar collector and a cylindrical heat exchanger geometry, other types of solar collector geometries may be employed, such as a series of movable circular parabolic dishes and a heat exchanger which has a partial spherical surface configuration. As a further alternative, instead of using so many tubes, a pair of cylindrical walled channels could be employed for confining the compressed heated air as it is passing through the recuperator and the solar collector chambers. Accordingly, the invention is not limited to the particular arrangements which have been illustrated and described in detail herein, rather it is defined only by the following claims.

What is claimed is:

1. In a tracking solar collector and heat engine having a solar collector, radiation focusing means for concentrating and focusing sunlight on said solar collector, and positioning means for causing said radiation focusing means to be maintained in alignment with the position of the sun, said solar collector having a collector chamber exposed to said sunlight, the provision of an improved heat exchanger and engine for use with said solar collector comprising:

a recuperator chamber proximate to and in thermal communication with said collector chamber;

a compressor for drawing in working fluid of a first specific heat and compressing said working fluid to a first pressure;

a two-stage heat exchanger having a fixed volume and comprising parallel conduits having recuperator and collector portions for carrying and heating said working fluid;

said two-stage heat exchanger having a recuperator stage within said recuperator chamber in which the recuperator portions of said parallel conduits are exposed to a recuperative heat source, and a collector stage within said collector chamber in which the collector portions of said parallel conduits are exposed to a solar radiation heat source;

said two-stage heat exchanger receiving working fluid compressed to a first specific heat and pressure from said compressor, heating said working fluid to a second, higher specific heat and pressure in said recuperator stage and from said solar radiation heat source in said collector stage;

an expander for receiving said working fluid at said second, higher specific heat and pressure from said two-stage heat exchanger and causing said working fluid to perform useful work; and exhaust heat duct means for delivering working fluid exhausted from said expander into thermal communication with said recuperator stage of the said two-stage heat exchanger.

2. The apparatus as defined in claim 1 wherein the working fluid is air and said compressor includes means for drawing in air from the surrounding environment at ambient temperature and pressure whereby said heat engine operates according to the thermodynamic properties of an air-standard cycle.

3. The apparatus as defined in claim 2 wherein said positioning means for maintaining said solar collector in alignment with the position of the sun includes diurnal tracking means for rotating said solar collector about an axis parallel to the axis of rotation of the earth to follow the diurnal movement of the sun, and seasonal adjustment means for adjusting the axis of rotation of said solar collector for the annual precession of the axis of rotation of the earth relative to the sun.

4. The apparatus as defined in claim 1 including a second hot air engine substantially identical to and interconnected with said first hot air engine, including a single recuperator chamber for enclosing said first stage of said heat exchanger, and wherein said heat exchanger apparatus includes first and second two-stage heat exchangers, each having a first stage positioned within said single recuperator chamber and being heated by the hot air exhausted by both of said hot air engines into said single recuperator chamber, and a second stage being heated by said solar collector.

5. The apparatus of claim 4 wherein said recuperator chamber comprises a plenum for circulating hot air exhausted from said hot engines about the recuperator portions of each of said parallel conduits of said heat exchanger apparatus.

6. The apparatus of claim 5 wherein said plenum is additionally provided with fuel burning means for heating the recuperator portion of each of said multiple tubes whereby fuel is selectively burned within said plenum chamber thereby imparting additional heat to said hot air exhausted from said hot air engines and further heating the air contained within said parallel conduits.

7. An improved hot air solar engine system comprising:

a solar heat source;

first and second heat exchangers for containing and carrying air proximate to and in thermal communication with said solar heat source;

first and second compressors for supplying air from the environment to said first and second heat exchangers, respectively, at a first predetermined pressure and substantially ambient temperature; and first and second mechanical expanders for receiving air from said first and second heat exchangers, respectively, at a second, higher, predetermined pressure and temperature and extracting useful work therefrom by mechanical expansion of the heated air;

said first and second compressors and said first and second mechanical expanders comprising interconnected piston and cylinder assemblies having a single piston assembly which includes the piston portion of each of said first and second compressors and said first and second mechanical expanders; and said system includes means whereby for said first compressor, said first heat exchanger and said first mechanical expander, and for said second compressor, said second heat exchanger, and said second mechanical expander, respectively, air is provided at a first predetermined pressure and ambient temperature by said compressor to said heat exchanger, said heat exchanger transfers heat from said solar heat source to the air, the heated air then flows from said heat exchanger to said mechanical expander in which mechanical expansion caused by the increased pressure of the heated air produces useful work.

8. The apparatus of claim 7 wherein each of said first and second heat exchangers has a recuperator stage and a collector stage; and including the provision of duct means for directing heated air exhausted from said expanders into said recuperator stage to heat incoming ambient air.

9. An improved hot air solar engine system comprising:

a solar heat source;

a recuperative heat source;

first and second heat exchangers for carrying and heating air, each of said heat exchangers having a first stage for containing and carrying said air proximate to and in thermal communication with said recuperative heat source, and a second stage contiguous to and in communication with said first stage for containing and carrying said air received from said first stage proximate to and in thermal communication with said solar heat source;

first and second compressors for supplying air from the environment to said first and second heat exchangers, respectively, at a first predetermined pressure and substantially ambient temperature; and first and second mechanical expanders for receiving heated air from said first and second heat exchangers, respectively, at a second, higher predetermined pressure and temperature and extracting useful work therefrom by mechanical expansion of the heated air;

said first and second compressors and said first and second mechanical expanders comprising interconnected piston and cylinder assemblies having a single piston assembly which comprises the piston portion of each of said first and second compressors and said first and second mechanical expanders;

said recuperative heat source comprising heated air exhausted from both of said mechanical expanders after having produced useful work, said heated air having a temperature greater than ambient temperature; and said system including means whereby for said first compressor, said first heat exchanger and said first mechanical expander, and for said second compressor, said second heat exchanger, and said second mechanical expander, respectively, air is provided at a first predetermined pressure and ambient temperature by said compressor to said heat exchanger, said first stage of said heat exchanger transfers a first quantum of heat from said recuperative heat source to the air, the air then flows to said second stage of said heat exchanger in which a second quantum of heat is transferred from said solar heat source to the air, the heated air then flows from said heat exchanger to said mechanical expander in which mechanical expansions caused by the increased pressure of the heated air produces useful work, the heated air is then exhausted from said expander into thermal communication with said first stage of said heat exchanger wherein heat remaining in the heated air after mechanical expansion is transferred to air contained in said first stage of said heat exchangers.

10. The apparatus of claim 9 wherein said piston assembly includes means for providing an intermittent reciprocating motion along said axis such that the respective piston heat portions move from a top-dead-center position to a bottom-dead-center position in response to expansion of the respective mechanical expander by heated air from its respective heat exchanger and thereby move the opposing piston heat portion from the bottom-dead-center position to a top-dead-center position compressing air contained in the opposing compressor into its respective heat exchanger.

11. The apparatus of claim 9 wherein said piston assembly has a unitary construction.

12. The apparatus of claim 9 wherein said piston assembly includes first and second opposing unitary piston head portions, each of said piston head portions being a surface of rotation about an axis which defines the direction of reciprocating motion of said piston assembly, each of said piston head portions having a compressor portion and a contiguous expander portion, said compressor portion being defined by a substantially cylindrical surface of a first diameter, coaxial with said axis, and having a compressor face perpendicular to said axis, said expander portion is defined by a substantially cylindrical surface of a second diameter, coaxial with said axis, and having an expander face extending from said second diameter cylindrical surface to said first diameter cylindrical surface of said contiguous compressor portion, said first and second piston head portions being interconnected by a connector rod portion mutually coaxial with each of said first and second piston head portions thereby translating motion of one of said piston heads from top-dead-center position to bottom-dead-center position into motion of the other piston head from bottom-dead-center position to top-dead-center position in a coordinated manner, said first and second piston head portions being received by mating first and second cylinder assemblies, respectively, each cylinder assembly having a compressor portion and a contiguous expander portion such that said compressor portions of said piston head portions and said compressor portions of said cylinder assemblies define said first and second compressors, and said expander portions of said piston head portions and said expander portions of said cylinder assemblies define said first and second mechanical expanders.

13. The apparatus of claim 12 wherein said first and second diameters are defined such that the area of said expander face projected on a plane perpendicular to said axis is substantially larger than the area of said compressor face projected on a plane perpendicular to said axis thereby giving said expander a mechanical advantage over said compressor.

14. The apparatus of claim 12 wherein each of said piston head portions has a medial and a distal end relative to said connecting rod; the surface of said compressor face is defined by a first diameter circular planar surface on the distal end of each piston head; and the surface of said expander face is defined by the surface of a hollow right frustum cone coaxial with said axis, having a base coinciding with the distal end of said second diameter cylindrical surface of said expander portion and a frustum coinciding with the medial end of said first diameter cylindrical surface of said compressor portion.

15. The apparatus of claim 12 wherein each of said mechanical expanders is further provided with an inlet valve for controlling the flow of heated air from the respective heat exchanger into said mechanical expander; and each of said hot air engines includes the provision of valve control means for causing said inlet valve to open in response to heated air within said heat exchanger achieving a predetermined peak pressure, and to close after said mechanical expander has fully expanded such that the piston portion of said mechanical expander has reached bottom-dead-center position thereby allowing heated air to flow from the respective heat exchanger into said mechanical expander and produce useful work.

16. The apparatus of claim 15 wherein each of said mechanical expanders is further provided with an exhaust valve for allowing heated air contained within said mechanical expander after it has fully expanded to be vented therefrom, and with exhaust valve control means for opening said exhaust valve in response to the piston portion of the mechanical expander reaching bottom-dead-center position and closing said exhaust valve in response to the piston portion of the mechanical expander reaching top-dead-center position.

17. The apparatus of claim 16 wherein each of said compressors is further provided with one-way, normally closed, intake and outlet valves, said intake valve opening in response to motion of the respective compressor piston portion from top-dead-center position to bottom-dead-center position to allow air from the environment to fill the compressor, said outlet valve opening in response to motion of said compressor piston portion from bottom-dead-center position to top-dead-center position to allow air compressed by said compressor to be delivered to the respective heat exchanger.

18. The apparatus of claim 9 wherein said solar collector includes the provision of:
focusing means for reflecting and focusing sunlight into a focal line segment, and
a heat boundary wall comprising a portion of a hollow cylinder extending circumferentially, radially equidistant from said focal line, said heat boundary wall and said focal line having lower and upper ends, said lower end being proximate said hot air engine, said heat boundary wall having multiple evenly spaced apertures positioned along a single plane perpendicular to said focal line and proximate said upper end of said heat boundary wall, said heat boundary wall having a radially inward and a radially outward surface, said radially outward surface comprising one surface of said recuperator chamber for enclosing said recuperator portions of said multiple tubes; each of said multiple tubes being configured in a generally elongated up-side down "U" shape and positioned such that each of said tubes passes through one of said multiple apertures in said heat boundary wall and positioned such that said heat boundary wall bisects said "U" shaped tube into two legs which extend from said lower end to said upper end of said heat boundary wall such that one leg of each of said tubes is positioned on the radially inward side of said heat boundary wall, parallel to said focal line and receiving solar radiation from said solar collector thereby comprising the collector portion of each of said multiple tubes, and the other leg of each of said multiple tubes is positioned adjacent the radially outward surface of said heat boundary wall, enclosed in said recuperator chamber, and is exposed to said hot air exhausted by said hot air engines thereby comprising said recuperator portion of each of said multiple tubes.

19. In a tracking solar collector and heat engine having a solar collector, positioning means for maintaining said solar collector in alignment with the position of the sun, and a hot air engine for use with said solar collector, said hot air engine including a compressor for drawing in air from the environment at an initial specific heat, compressing and delivering said air at a first pressure, and an expander for receiving said air at a second, higher pressure and specific heat and causing said air to perform useful work, the provision of an improved heat exchanger apparatus for heating the air supplied by said compressor to said second, higher pressure and specific heat comprising:
a two-stage heat exchanger having a first stage being heated by hot air exhausted from said hot air engine and a second stage being heated by said solar collector, said second stage of said heat exchanger being positioned contiguous to the first stage of said heat exchanger for improving heat absorption by said heat exchanger;
whereby air delivered to said heat exchanger apparatus by said compressor at a first pressure and specific heat is heated by hot air exhausted from said hot air engine in said first stage of said heat exchanger and is further heated by solar radiation collected by said solar collector in said second stage of said heat exchanger to said second, higher pressure and specific heat, said air then being delivered to said expander wherein said air performs useful work.

20. The apparatus of claim 19 wherein said two-stage heat exchanger has a fixed volume and comprises multiple tubes connected in parallel for carrying and heating air delivered by said compressor, said multiple tubes having recuperator and collector portions, said first stage of said two-stage heat exchangers comprising the recuperator portions of said multiple tubes enclosed in said recuperator chamber and exposed to hot air exhausted by both of said hot air engines, said second stage of said two-stage heat exchangers comprising the collector portions of said multiple tubes exposed to solar radiation in said solar collector.

21. The apparatus of claim 20 wherein said positioning means comprises diurnal tracking means for rotating said solar collector about a polar axis and thereby causing said solar collector to be maintained in alignment with the diurnal position of the sun, and seasonal adjustment means for adjusting the polar axis of rotation of said solar collector for maintaining the diurnal path of said solar collector in response to said diurnal tracking means in alignment with the seasonal variations in the diurnal path of the sun.

22. An improved hot air solar engine which comprises:
a base;
a shaft carried by said base and rotatably journaled with respect thereto;
collector mounting means rigidly mounted to said shaft;
a solar collector carried on said shaft by said collector mounting means such that said solar collector is rotatable relative to the base about the axis of rotation of said shaft;
seasonal adjustment means included in said base for varying the angle of incidence between the axis of rotation of said shaft and a horizontal plane defined by said base;
diurnal tracking means mounted to said base and connected with said shaft of said solar collector and including driving means for rotating said solar collector about said shaft;
whereby said seasonal adjustment means and said diurnal tracking means together maintain the solar collector in alignment with the seasonal and diurnal position of the sun;
said solar collector including an elongated parabolic reflector having a linear focal point and including a collector core for receiving solar radiation passing through said linear focal point;
first and second heat engines including a single unitary piston assembly and two opposing cylinder assemblies forming first and second compressors and first and second mechanical expanders;
said collector core including a heat boundary wall defined by the surface of a hollow cylinder portion coaxial with said linear focal point, said heat boundary wall being the common wall of a collector chamber and a recuperator chamber, said heat boundary wall having multiple apertures arranged in a plane perpendicular to said linear focal point and proximate one end thereof, first and second two-stage heat exchangers including multiple tubes each having a generally up-side down elongated "U" shape and formed of heat conductive material;

said heat exchanger tubes positioned relative to said heat boundary wall such that said wall substantially bisects each of said "U" shaped tubes as they extend through said multiple apertures, each of said tubes having an ascending portion encased in said recuperator chamber and a descending portion located in said collector chamber within the collector core of said solar collector, said heat exchanger tubes arranged circumferentially, equidistant from said linear focal point and proximate said heat boundary wall such that the descending portion of said heat exchanger tubes are positioned adjacent to the radially inward surface of said heat boundary wall exposed to radiant energy collected by said solar collector and forming the collector stage of said first and second heat exchangers, the ascending portion of said heat exchanger tubes being positioned adjacent the radially outward surface of said heat boundary wall and encased in said recuperator chamber, said recuperator chamber forming a plenum receiving heated air exhausted by said first and second expanders and circulating said heated air proximate to and in thermal communication with said ascending heat exchanger portions such that the heat of the exhausted air is transferred to the heat exchanger tubes thereby recuperating the heat contained in said exhaust air, said ascending portion of said heat exchanging tubes so encased form the recuperator stage of said heat exchangers;

said recuperator chamber further includes combustion means for further heating said exhaust air;

said multiple heat exchanger tubes being arranged with respect to said heat boundary wall such that each of the tubes of one heat exchanger is interspaced between two tubes of the other heat exchanger;

said piston assembly including two opposing piston heads interconnected by a connecting rod, each of said piston heads having an expander portion substantially defined by a cylindrical surface of a first diameter and a compressor portion substantially defined by a cylindrical surface of a second, smaller diameter, said compressor portion integral with said expander portion; said expander portions, collector portions and connecting rod having a common longitudinal axis such that each is coaxial with respect to said axis;

said compressor portions each including a compressor face defined by a substantially circular planar surface perpendicular to said longitudinal axis and defining the distal end of said cylindrical surfaces of each of said compressor portions relative to said connecting rod;

said expander portions each including an expander face having an area larger than said compressor face and defined by the beveled surface of a right frustum cone which has a base defined by the distal end of said cylindrical surface of said expander portion and a frustum defined by the medial end of said cylindrical surface of said compressor portion; said right frustum cone being coaxial with said longitudinal axis;

said connecting rod rigidly connects the inner side of the expander portion of one piston head of said piston assembly to the inner side of the expander portion of the other piston head of said piston assembly;

each of said opposing heads of said piston assembly being received by a respective mating cylinder assembly, each of said cylinder assemblies having a compressor portion and a contiguous expander portion;

said compressor portions of said piston heads and said compressor portion of said cylinder assemblies together define first and second compressors;

said expander portions of said piston heads and said expander portions of said cylinder assemblies together defining first and second mechanical expanders;

whereby for said first compressor, said first two-stage heat exchanger and said first expander, and for said second compressor, second heat exchanger and said second expander, respectively, said compressor draws in air from the environment at ambient temperature and pressure and compresses the air to a first pressure for delivery to said two-stage heat exchanger, said two-stage heat exchanger receives the air in the recuperator stage, imparts a first quantum of heat to said air from said heated exhaust air, said air flows to said collector stage and receives a second quantum of heat from solar radiation reflected and focused into the collector core solar by said collector, said recuperator stage and said collector stage together heating said air in a fixed volume to a second, higher pressure and providing the heated air to the expander wherein the heated air at increased pressure causes motion of the expander piston thereby expanding the heated air and performing useful work, concurrently the expansion motion of the one expander causes compression motion of the opposing compressor preparing the opposing heat exchanger and engine for reciprocating motion, fully expanded heated air is further heated by said combustion means and delivered into said recuperator chamber wherein it imparts heat through the walls of said multiple tubes to the air contained therein.

* * * * *